(12) United States Patent
Kleinschmidt et al.

(10) Patent No.: US 6,553,050 B1
(45) Date of Patent: *Apr. 22, 2003

(54) NARROW BAND EXCIMER OR MOLECULAR FLUORINE LASER HAVING AN OUTPUT COUPLING INTERFEROMETER

(75) Inventors: Juergen Kleinschmidt, Weissenfels (DE); Peter Lokai, Goettingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,883

(22) Filed: Feb. 21, 2002

Related U.S. Application Data

(63) Continuation-in-part of application No. 09/715,803, filed on Nov. 17, 2000.
(60) Provisional application No. 60/280,398, filed on Mar. 29, 2001, provisional application No. 60/195,169, filed on Apr. 6, 2000, provisional application No. 60/166,854, filed on Nov. 22, 1999, and provisional application No. 60/166,277, filed on Nov. 18, 1999.

(51) Int. Cl.⁷ .................................................. H01S 3/22
(52) U.S. Cl. .............................. 372/57; 372/92; 372/99; 372/108; 372/98
(58) Field of Search ........................... 372/57, 99, 98, 372/108, 92, 95

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |

(List continued on next page.)

FOREIGN PATENT DOCUMENTS

| | | | | |
|---|---|---|---|---|
| DE | 298 22 090 U 1 | 3/1999 | ............. | H01S/3/08 |
| DE | 299 07 349 U 1 | 8/2000 | ............. | H01S/3/086 |
| EP | 1 041 689 A1 | 10/2000 | ......... | H01S/3/1055 |

(List continued on next page.)

OTHER PUBLICATIONS

Finkelstein et al., "A Rectilinear Transmission Grating and Applications," *JOSA*, vol. 43., 1953., pp. 335.
Watts, J.K., "Theory of Multiplate Resonant Reflectors," *Applied Optics*, Aug. 1968, vol. 7, No. 8., pp. 1521–1523.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

An excimer or molecular fluorine laser includes a discharge chamber filled with a gas mixture, multiple electrodes within the discharge chamber connected to a power supply circuit for energizing the gas mixture, and a resonator including the discharge chamber and a pair of resonator reflectors for generating an output laser beam. The resonator includes an interferometric device, which may be a resonator reflector such as an output coupling interferometer or HR reflector, or a transmissive intracavity component, including a pair of opposing reflecting surfaces tuned to produce a response maximum at a selected wavelength for narrowing a linewidth of the output laser beam. One of the pair of opposing reflecting surfaces is preferably configured such that the opposing reflecting surfaces of the interferometer have a varying optical distance therebetween over an incident beam cross-section which serves to suppress at least one side band or outer portions of the response maximum to reduce spectral purity. Preferably, this surface is non-planar, and may include a step, a recess or a raised or recessed curved portion of a quarter wavelength in height or depth, respectively, and may be cylindrical, Gaussian or spherical, and the curvature may extend over the entire reflecting surface or diameter of the incident beam. The curved surface may be part of a component that couples with a base optical block at a surface opposing the other reflecting surface, such as by a slot defined in the optical block or using an adhesive.

30 Claims, 14 Drawing Sheets

U.S. PATENT DOCUMENTS

| | | | |
|---|---|---|---|
| 3,609,586 A | 9/1971 | Danielmeyer et al. | 331/94.5 |
| 3,609,856 A | 10/1971 | Eckert | 29/473.1 |
| 3,868,592 A | 2/1975 | Yarborough et al. | 331/94.5 |
| 4,393,505 A | 7/1983 | Fahlen | 372/57 |
| 4,399,540 A | 8/1983 | Bucher | 372/28 |
| 4,477,909 A * | 10/1984 | Salvi et al. | 372/98 |
| 4,611,270 A | 9/1986 | Klauminzer et al. | 364/183 |
| 4,616,908 A | 10/1986 | King | 350/576 |
| 4,691,322 A | 9/1987 | Nozue et al. | 372/82 |
| 4,696,012 A | 9/1987 | Harshaw | 372/99 |
| 4,803,696 A | 2/1989 | Pepper et al. | 372/95 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,926,428 A | 5/1990 | Kajiyama et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 5,025,445 A | 6/1991 | Anderson et al. | 372/20 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,221,823 A | 6/1993 | Usui | 219/121.78 |
| 5,226,050 A | 7/1993 | Burghardt | 372/20 |
| 5,337,330 A | 8/1994 | Larson | 372/86 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,406,571 A | 4/1995 | Bucker et al. | 372/20 |
| 5,440,574 A | 8/1995 | Sobottke et al. | 372/34 |
| 5,440,578 A | 8/1995 | Sandstrom | 372/59 |
| 5,450,207 A | 9/1995 | Fomenkov | 356/416 |
| 5,479,431 A | 12/1995 | Sobottke et al. | 372/92 |
| 5,532,880 A | 7/1996 | Robb | 359/665 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,625,499 A | 4/1997 | Chen | 359/831 |
| 5,646,954 A | 7/1997 | Das et al. | 372/55 |
| 5,652,681 A | 7/1997 | Chen et al. | 359/831 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,761,236 A | 6/1998 | Kleinschmidt et al. | 372/100 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov et al. | 372/57 |
| 5,898,725 A | 4/1999 | Fomenkov et al. | 372/102 |
| 5,901,163 A | 5/1999 | Ershov | 372/50 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,346 A | 11/1999 | Mizuno et al. | 369/112 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,016,479 A | 1/2000 | Taricani, Jr. | 705/19 |
| 6,018,537 A | 1/2000 | Hofmann et al. | 372/25 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 9,276,057 | 5/2000 | Levesque et al. | 356/349 |
| 6,128,323 A | 10/2000 | Myers et al. | 372/38 |
| 6,137,821 A | 10/2000 | Ershov | 372/108 |
| 6,153,886 A | 11/2000 | Hagiwara et al. | 250/548 |
| 6,154,470 A | 11/2000 | Basting et al. | 372/19 |
| 6,240,110 B1 | 5/2001 | Ershov | 372/20 |
| 6,421,365 B1 * | 7/2002 | Kleinschmidt et al. | 372/108 |
| 2001/0028456 A1 | 10/2001 | Nishi | 356/400 |

FOREIGN PATENT DOCUMENTS

| | | | |
|---|---|---|---|
| EP | 1 102 368 A2 | 5/2001 | H01S/3/081 |
| EP | 1 119 083 A2 | 7/2001 | H01S/3/08 |
| JP | 60 16479 | 1/1985 | H01S/3/081 |
| JP | 8 274399 | 11/1986 | H04S/3/104 |
| JP | 62 160783 | 7/1987 | H01S/3/115 |
| JP | 2 152288 | 6/1990 | H01S/3/106 |

OTHER PUBLICATIONS

M. Born, et al., Principles of Optics, at p. 325, Pergamon, 1970.

Bloom, A.L., "Modes of a Laser Resonator Containing Tilted Birefringent Plates," *Journal of the Optical Society of America*, vol. 64, No. 4, Apr. 1974.

Okada, M., et al., "Electronic Tunig of Dye Lasers by an Electroptic Birefringent Fabry–Perot Etalon," *Optics Communications*, vol. 14, No. 1, May 1975.

Rice, J.K., "VUV Emissions from Mixtures of F2 and the Noble Gasses—A Molecular F2 laser at 1575 Aa)," *Applied Physics Letters*, vol. 31, No. 1, Jul. 1, 1977.

Saika, S., "Nitrogen–Laser–Pumped Single–Mode Dye Laser," *Applied Physics*, 1978.

Woodworth, J.R., et al., "An Efficient, High Power F2 Laser Near 157 nma)," *The Journal of Chemical Physics*, vol. 69, Sep. 15, 1978.

S. Sumida, et al., "Novel Neutral Atomic Fluorine Laser Lines in a High–pressure Mixture of F2 and He," *Journal of Applied Physics*, vol. 50, No. 6, Jun. 1979.

Pummer, H., et al., "Discharge Pumped F2 Laser at 1580 A", *Optics Communications*, vol. 28, No. 1, Jan. 1979.

Hohla, K., et al., "CIF and F2: Two New Ultra–violet Laser Systems," *Optics and Laser Technology*, vol. 11, No. 6, Dec. 1979.

Hutchinson, M.H.R., "Vacuum Ultraviolet Excimer Laser," *Applied Optics VUV VI*, vol. 19, No. 23, Dec. 1, 1980, pp. 3883–3888.

R. Sadighi–Bonabi, et al., "Gain and Saturation of the Atomic Fluorine Laser," *Journal of Applied Physics*, vol. 53, No. 5, May 1982.

S. Marcus, "Cavity Dumping and Coupling Modulation of an Etalon–Coupled CO2 Laser," *J. Appl. Phys.*, vol. 63, No. 9, Sep. 1982.

Koprinkov, I.G., et al., "Intense Laser Generation from an Atomic–Fluorine," *Applied Physics*, vol. B33, No. 4, Apr. 1984.

A.C. Cefalas, et al., "Gain Measurements at 157 nm in an F2 Pulsed Discharge Molecular Laser," *Optics Communications*, vol. 55, No. 6, Oct. 15, 1985.

E. Armandillo, et al., "Simple, Compact, High–repetition Rate XeCI Laser," *Review of Scientific Instruments*, vol. 56, No. 5, Part 1, May 1985.

McKee, T., "Spectral–narrowing Techniques for Excimer Laser Oscillators," *Can J Phys*, 1985, vol. 63., pp. 214–219.

V.N. Ishchenko, et al., "High–power Efficient Vacuum Ultraviolet F2 Laser Excited by an Electric Discharge," *Soviet Journal of Quantum Electronics*, vol. 16, No. 5, May 1986.

ZOS, Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer.

H. Lengfellner, et al., "Generation of Tunable Pulsed Microwave Radiation by Nonlinear Interaction of Nd:YAG Laser Radiation in GaP Crystals," *Optics Letters*, vol. 12, No. 3, Mar. 1987.

Wani, K., et al., Narrow–band KrF Excimer Laser—Tunable and Wavelength Stabilized, *SPIE—The International Society for Optical Engineering, Excimer Beam Applications*, vol. 998, Sep. 1988, Boston, Massachusetts.

Uematsu, T, et al., "Theoretical Simulation of a Discharge–pumped F2 Excimer Laser," *Discharge–Pumped Excimer Laser Research in Japan*, Apr. 1988.

McKee, T.J., et al., "Line–narrowed Industrial Excimer Laser for Microlithography," *Conference on Lasers and Electro–Optics, 1989 Technical Digest Series*, vol. 11, Apr. 24–29, 1989, Baltimore, Maryland.

Yamada, K., et al., "High Power Discharge–pumped F2 Laser," *Lasers and Electro–Optics Society Annual Meeting Conference Proceedings, Leos '89*, Oct. 17–20, 1989.

Yamada, K., et al., "High–power Discharge–pumped F2 Molecular Laser," *Applied Physics Letters*, vol. 54, vol. 7, Feb. 13, 1989.

Wataru Sasaki et al., "Intense VUV–XUX Generation from Rare Gas Excimers," *Conference on Lasers and Electro–Optics, 1989 Technical Digest Series*, vol. 11, May 24–28, 1989.

Shaw, "Excimer Laser Resonator," Shaw, "Excimer Laser Resonator," *Physics and Technology of Laser Resonators*, Bristol New York, 1989, pp. 244–245.

Magni, Resonator with Variable Reflectivity Mirrors, in Shaw, at pp. 94–105.

Science Report, Lambda Physik, No. 3, Nov. 1990, "Breakthrough in F2 Laser Technology" pp. 1–4.

F. Voss, "Optimierung der VUV–Emission bei 157 nm (F2–Linie) bei Entladungs—gepemten Excimerlasern,"*Verhanlungen*, Mar. 1990, Physikertagung Munchen 1990., pp. 450–451.

Kakehata, M., "High Specific Output Energy Operation of a Vacuum Ultraviolet Molecular Fluorine Laser Excited at 66 MW/cm3 by an Electric Discharge," *Applied Physics Letters*, vol. 56, No. 26.

Katehata, M., et al., "Frequency up–conversion of a Discharge Pumped Molecular Fluorine Laser by Stimulated Raman Scattering in H2," *Gas Flow and Chemical Lasers, SPIE*, vol. 1397, Sep. 10–14, 1990.

K. Komatsu, et al., "Spectroscopic Comparison Between Low and High Pressure Discharge Pumped Xe Atomic Lasers," *Conference on Laser and Electro–optics*, 1990 Technical Digest Series, vol. 7, May 21–25, 1990.

C. Skordoulis, et al., "Ampification Characteristics of a Discharge Excited F2 Laser," *Journal of Modern Optics*, vol. 37, No. 4, Apr. 1990.

Traub, W., "Constant–dispersion Grism Spectrometer for Channeled Spectra," *Optical Society of America*, Sep. 1990, vol. 7., No. 9., pp. 1779–1791.

Highlights, Lambda Physik, No. 29, Jun. 1991, "VUV Spectroscopy by Frequency Trippling" pp. 1–6.

Momma, C., "Stimulated Raman Scattering of a F2–Laser in H2," *Institut Fur Quantenopik*, Oct. 22, 1991.

Tagungsband, Vom. 24, Bis. 26, Sep. 1991, Abstract: "Vakuum UV Molekullaser mit hoher Ausgangsleistung" 3 pages.

Kakehata, M., "Efficiency Characterization of Vacuum Ultraviolet Molecular Fluorine (F2) Laser (157nm) Excited by an Intense Electric Discharge," *IEEE Journal of Quantum Electronics*, Nov. 1991, vol. 27, No. 11.

Highlights, Lambda Physik, No. 33, Feb. 1992, "VUV Strokes and Anti–Strokes Raman Lines Dervied from an F2 Laser" 5 pages.

S.M. Hooker, et al., "Influence of Cavity Configuration on the Pulse Energy of a High–Pressure Molecular Fluorine Laser," *Applied Physics B Photo–physics and Laser Chemistry*, vol. 1, 1992.

Bastiaens, H.M.J., et al., "Small–signal Gain Measurements in an Electron Beam Pumped F2 Laser", *Applied Physics Letters*, vol. 63, No. 4, Jul. 26, 1993.

Highlights Lambda Physik, Apr. 1993, "Excimer Laser Based Microstructuring Using Mask Projection Technique," U. Sarbach.

High Power Laser & Particle Beams, vol. 6, No. 4, Series No. 24, Nov. 15, 1994, 12 pages in Japanese.

Highlights, Lambda Physik, No. 43, Jan. 1994, "Photochemical Modification of Fluorocarbon Resin to Generate Adhesive Properties" pp. 1–6.

F.T.J.L. Lankhorst, et al., "Long Pulse Electron Beam Pumped Molecular F2–Laser," *Journal of Applied Physics*, vol. 77, Jan. 1–15, 1995.

Demtroder, W., Laser Spectroscopy Springer, *Berlin Heidelberg*, 1996, pp. 99–221.

Ohwa, M., "Theoretical Evaluation of High–efficiency Operation of a Discharge–pumped Vacuum–ultraviolet F2 Lasers," *Applied Optics Letters*, vol. 51, No. 13, Sep. 28, 1997.

Kitamura, et al., "Small–signal Gain Measurements in a Discharge–pumped F2 Laser," *Journal of Applied Physics*, vol. 81, No. 6, Mar. 1997, pp. 2523–2528.

Giuri, et al., "Output Coupler Design of Unstable Cavities for Excimer Lasers," *Optics*, 1997, 1143–1148.

Hultzsch, R., "Gitterprismen," *Photonik*, Sep. 1998., pp. 40–41. This publication is in German.

Geyer et al., Double Gratings–Prism, *Astr. Astraphys.*, vol. 148., pp. 312–316, 1985.

Kakehata, M. et al., "CTUH15 Experimental Study of Tunability of a Discharge Pumped Molecular Fluorine Laser," *CLEO 90/Tuesday Poster*, pp. 106–108, 1990.

D. Basting, et al., "Processing of PTFE with High Power VUV Laser Radiation".

* cited by examiner

NARROW BAND EXCIMER OR MOLECULAR FLUORINE LASER HAVING AN OUTPUT COUPLING INTERFEROMETER

PRIORITY

This application claims the benefit of priority to U.S. provisional patent application No. 60/280,398, filed Mar. 29, 2001, and is a Continuation-in-Part application which claims the benefit of priority to U.S. patent application Ser. No. 09/715,803, filed Nov. 17, 2000, which claims the benefit of priority to U.S. provisional patent application No. 60/195, 169, filed Apr. 6, 2000, No. 60/166,854, filed Nov. 22, 1999, and No. 60/166,277, filed Nov. 18, 1999.

BACKGROUND OF THE INVENTION

1. Field of the Invention

The invention relates to narrow band lasers and particularly to an excimer or molecular fluorine laser having output coupling interferometer.

2. Discussion of the Related Art

Narrow band excimer lasers ($\lambda$=193 nm, 248 nm) are applied in photolithographic applications for production of integrated circuits. Excimer laser radiation is used for making structures in the dimensional range of <0.18–0.25 $\mu$m (KrF-laser radiation) or <0.13–0.18 $\mu$m (ArF-laser radiation). The molecular fluorine laser emitting around 157 nm ($F_2$-laser) is being developed for feature sizes <0.13 $\mu$m. Achromatic imaging optics are difficult to produce for this wavelength region. For this reason radiation of narrow bandwidth is desired to control imaging errors caused by chromatic aberration. Acceptable bandwidths are typically less than 0.6 pm.

Another important beam parameter is the spectral purity, or the bandwidth which contains 95% of the output pulse energy. High numerical aperture (NA) optics use <1 pm bandwidth radiation. This can achieved by using of two spectral narrowing elements such as a grating and intracavity etalon or etalon output coupler.

Etalon outcoupling mirrors have been used for a long time and in various different types of lasers. A simple example of a plane-plane cavity for an excimer laser can be formed by a highly reflective (HR) back-mirror and an uncoated solid etalon as an outcoupling resonator reflector.

U.S. Pat. Nos. 5,901,163 and 5,856,991 each to Ershov relate to a resonator including an etalon output coupler for a narrow band excimer laser, as shown in FIG. 1 (which is FIG. 3 of the '991 patent). The resonator consists of a line narrowing module (18) consisting of an echelle grating and a prism beam expander, and a plane-parallel air spaced etalon (44) as an outcoupling mirror.

The echelle grating based line narrowing module produces a laser beam having a spatial variation in wavelength (chirp) along a beam cross section direction (direction of dispersion). FIG. 2 shows a typical spatial distribution of a laser spectrum across the beam created by the grating. The laser resonator used for generating the spectrum in FIG. 2 consists of an echelle grating, prism beam expander and a typical partially reflecting outcoupling mirror having a reflectivity of, e.g., 20–25%.

Thus, for the arrangement of FIG. 1, the line narrowing module (18) provides a spatial distribution of wavelengths at the outcoupling etalon that is approximately given by:

$$\lambda(x) = \lambda(0) + (d\lambda/dx)x \quad \text{(equation 1);}$$

where x is the coordinate along the short beam axis, and x=0 is the beam center. For the example depicted in FIG. 2, the "spatial chirp" is $d\lambda/dx \approx 0.83$ pm/mm. This value depends on the linear dispersion of the echelle grating and the laser design (i.e., the distance between the grating and outcoupling etalon, the discharge width, etc.).

FIGS. 3a, 3b show two calculated spatial distributions of laser spectra for two different gratings ($d\lambda/dx$=0.83 pm/mm and 1.24 pm/mm), an airspaced plane-parallel uncoated etalon with FSR=1.6 pm as outcoupler and otherwise the same resonator designs. FIG. 3c shows the measured spectrum for a grating with $d\lambda/dx$=1.24 pm/mm and an outcoupler etalon with FSR=1.6 pm. The calculations are in a good agreement with the experimental findings (i.e., compare FIGS. 3b and 3c).

To avoid "side modes" the following relation is fulfilled:

$$(d\lambda/dx) \cdot b \leq 0.5 \, FSR \quad \text{(equation 2);}$$

where b is the beam width in front of the etalon. Higher values for $d\lambda/dx$ can be achieved by using more highly dispersive gratings, or bending the grating such as is disclosed in U.S. Pat. No. 5,095,492 to Sandstrom. As it is desired to produce still smaller structures on silicon substrates, it is desired to further reduce the spectral purity of excimer laser exposure beams.

SUMMARY OF THE INVENTION

It is therefore an object of the invention to provide a narrow band excimer or molecular fluorine laser having improved spectral purity.

In accordance with this object, an excimer or molecular fluorine laser is provided including a discharge chamber filled with a gas mixture, multiple electrodes within the discharge chamber connected to a power supply circuit for energizing the gas mixture, and a resonator including the discharge chamber and a pair of resonator reflectors for generating an output laser beam.

In a preferred embodiment, the resonator includes an interferometer including a pair of opposing reflecting surfaces configured so that the interferometer is tuned to have a response maximum at a selected wavelength around approximately an intensity maximum of the beam incident upon the interferometer, and at least one sideband of the response spectrum of the interferometer is also within the intensity spectrum of the beam incident upon the interferometer. At least a first of the pair of opposing reflecting surfaces is configured such that the first and second opposing reflecting surfaces have a varying optical distance therebetween over the incident beam cross-section which serves to suppress the at least one sideband around the response maximum to improve spectral purity such that the interferometer with non-parallel opposing reflecting surfaces has a response spectrum including a narrow response maximum and at least one sideband which is substantially suppressed to provide an output beam at high spectral purity.

In a preferred embodiment, one of the resonator reflectors is an output coupling interferometer wherein the pair of opposing reflecting surfaces is tuned to produce a reflectivity maximum at a selected wavelength for narrowing a linewidth of the output laser beam. Alternatively, the interferometer may be configured to operate in transmissive mode within the resonator.

Preferably, at least the first reflecting surface is non-planar, and may include a step, a recess or a raised or recessed curved portion of a quarter wavelength in height or depth, respectively. Also preferably, at least the first reflecting surface has a curvature such that the first and second opposing reflecting surfaces have a varying optical distance therebetween over an incident beam cross-section that serves to suppress outer portions of the reflectivity maximum to improve spectral purity. The first surface may have a constant curvature over at least an incident beam width. The first surface may be part of a coupling component coupled to a base optical block opposing the second surface of the pair of opposing reflecting surfaces.

A beam expander may be disposed before the output coupling interferometer. The beam expander reduces the divergence of the beam incident at the interferometer, the resolution of the interferometer is improved, and the spectral purity is improved in accord with the object of the invention. The beam expander may include one or more beam expanding prisms or a lens arrangement.

BRIEF DESCRIPTION OF THE DRAWINGS

FIG. 4c shows a calculated spectrum of a KrF excimer laser including the first output coupling interferometer of FIG. 4a.

FIG. 5c shows a calculated spectrum of a KrF excimer laser including the third output coupling interferometer of FIG. 5a.

FIG. 6c shows a calculated spectrum of a KrF excimer laser including the fifth output coupling interferometer of FIG. 6a.

INCORPORATION BY REFERENCE

Figure 1:
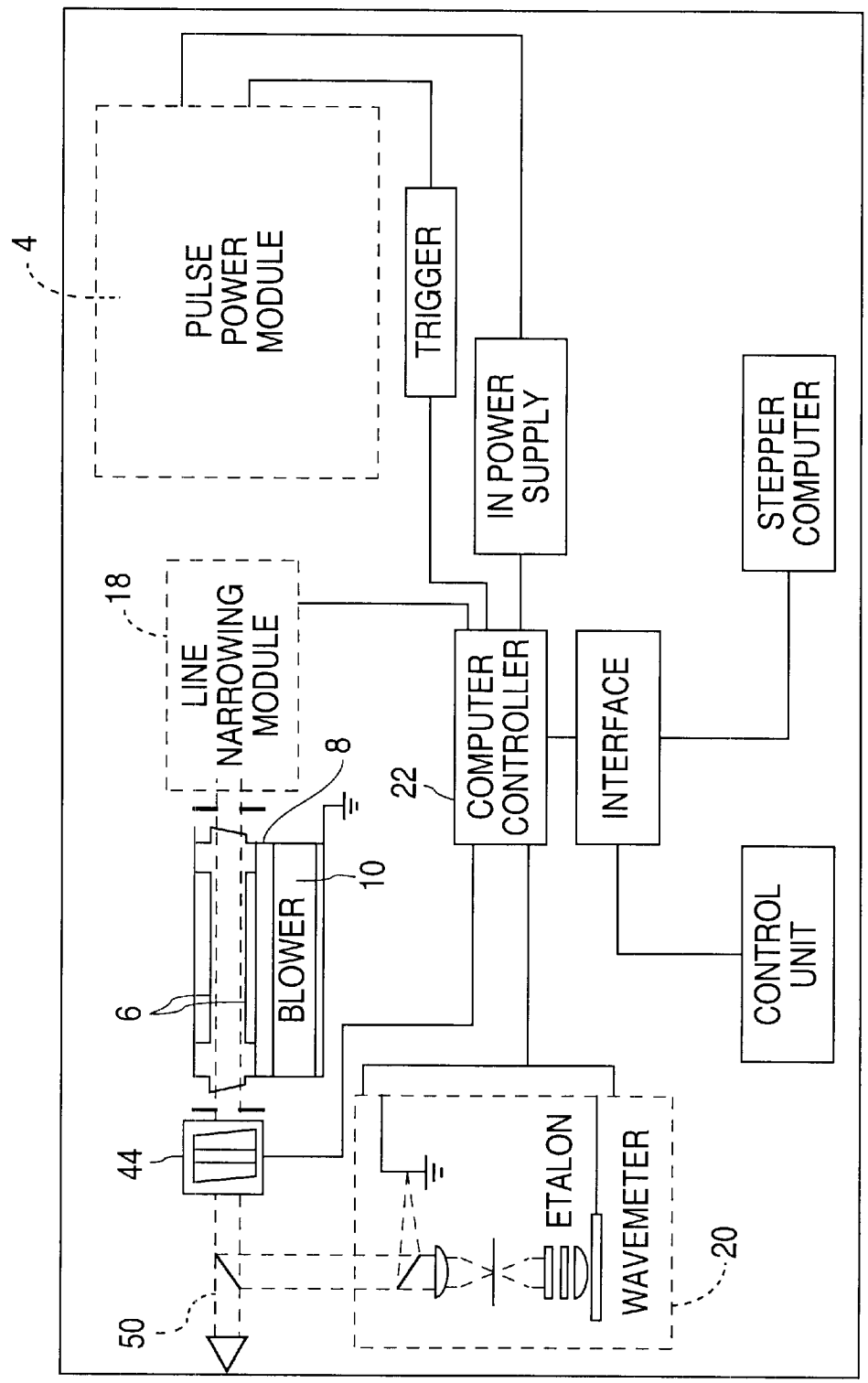
FIG. 1 schematically shows a conventional narrow band excimer laser including a grating-based line-narrowing module and an etalon output coupler.
Figure 2:
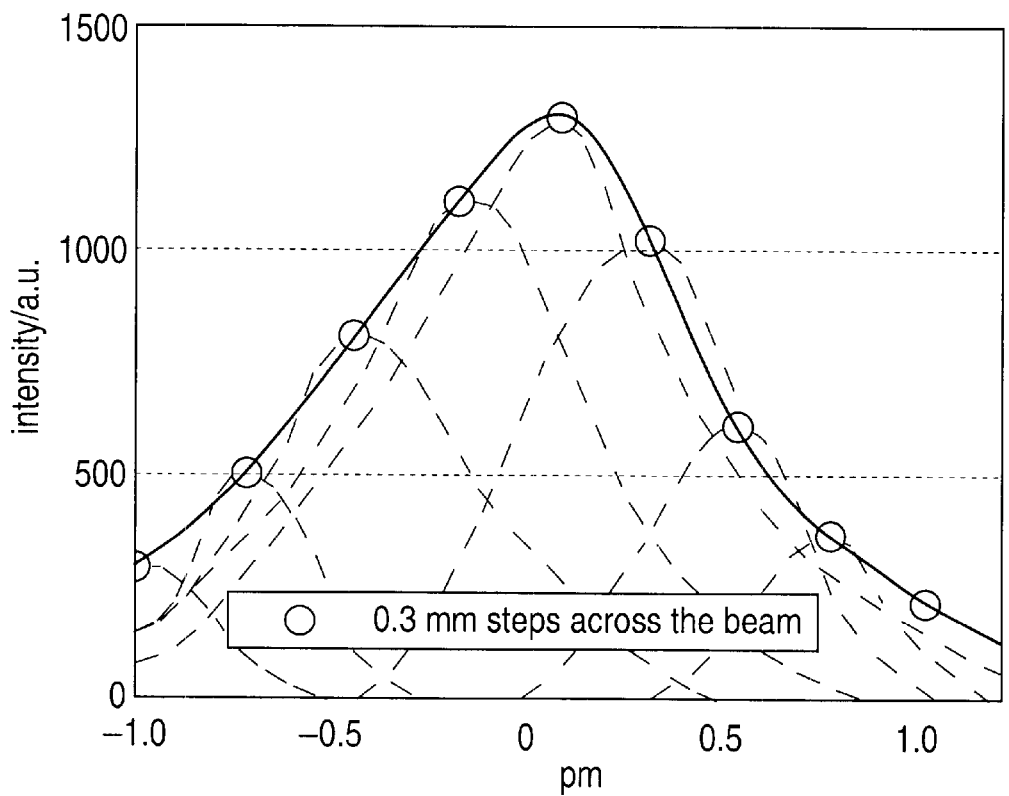
FIG. 2 shows a spatial distribution of a laser spectrum for a narrow band laser having a conventional partially reflecting output coupling mirror.

What follows is a cite list of references each of which is, in addition to those references cited above and below, and including that which is described in the related art description and in the priority section, and the above invention summary, and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below and within the scope of the present invention. Further patent, patent application and non-patent. references are cited in the written description and are also incorporated by reference into the detailed description of the preferred embodiment with the same effect as just described with respect to the following references:

German Utility Model No. 299 07 349.1;

U.S. Pat. Nos. 5,901,163, 5,856,991, 6,028,879, 6,285,701, 6,243,405, 6,154,470, 5,559,816, 4,977,563, 4,611,270, 6,061,382, 5,406,571, 5,852,627, 3,609,856, 5,095,492 3,471,800, 3,546,622, 5,440,574, and 5,479,431;

Japanese patents no. 8-274399, 2-152288, 60-16479, and 62-160783;

S. Marcus, Cavity Dumping and Coupling Modulation of an Etalon-Coupled $CO_2$ Laser, J. Appl. Phys., Vol. 63, No. 9 (September 1982);

H. Lengfellner, Generation of Tunable Pulsed Microwave Radiation by Nonlinear Interaction of Nd:YAG Laser Radiation in GaP Crystals, Optics Letters, Vol. 12, No. 3 (March 1987);

W. Born and E. Wolf, Principles of Optics, at p. 325, Pergamon (1970);

Shaw, Excimer Laser Resonators, Physics and Technology of Laser Resonators, at pp237–245, Bristol N.Y. (1989)

Magni, Resonators with Variable Reflectivity Mirrors, in Shaw, at pp.94–105, see above;

Giuri et al, Appl. Opt. 26, 1143 (1997); and

U.S. patent application Ser. Nos. 09/771,366, 09/317,695, 09/244,554, 09/454,803, 09/657,396, 09/883,097, 09/599,130, 09/602,184, 09/629,256, 09/738,849, 09/718,809, 09/843,604, 09/900,703, 09/960,875, and 09/715,803, each of which is assigned to the same assignee as the present application.

DETAILED DESCRIPTION OF THE PREFERRED EMBODIMENTS

The preferred embodiments below describe an output coupling interferometer designed to suppress the "side modes" of an excimer or molecular fluorine laser output beam. The preferred embodiments describe preferred outcoupling devices that serve as a combination of a spectral purity reducing optical element and a divergency reducing optical element. The interferometric devices described herein may also be configured in highly reflective mode as highly reflective resonator reflectors, or in transmissive mode and located in the resonator between the resonator reflector surfaces, although the description below will generally refer to output coupling interferometers. The effect of the output coupling interferometric devices described below can be mathematically derived by modifying calculations relating to an air-spaced optical etalon. Such an etalon comprises a pair of plane-parallel reflecting surfaces separated by an air gap (wherein inert gases typically reside in the "air" gap). The reflectivity formula for an air-spaced etalon can be found in physics textbooks like Born "Optics":

$$R = 4R_0 \sin^2\delta / ((1-R_0)^2 + 4R_0 \sin^2\delta) \quad \text{(equation 3)};$$

where $\delta = (2\pi/\lambda)d$, d is the spacer thickness or separation between the plates of the etalon, and $R_0$ is the reflectivity of the etalon mirrors.

Maximum reflectivity is achieved for $\delta = (m \pm 1/2)\pi$ or $(m \pm 1/2)\lambda/2 = d_1$. Reflectivity R=0 is achieved for $\delta = m\pi$ or $m\lambda/2 = d_2$ (m-integer). The plate separation difference for these two cases is given by $d_1 - d_2 = \pm \lambda/4$. Etalon plates can also have curved reflecting surfaces as long as their separation always remains constant (see S. Marcus, J. Appl. Phys. Vol. 53, No. 9 at 6029 (September 1982)). In this case, the spacing between the two etalon plates at the center of the beam cross section x=0 and across the spatial extent of the plates may be set to get $R = R_{max}$. The arrangement can be modified from this etalon configuration where the spacing remains constant over the spatial extent of the plates such that the spacing is varied. In this modified interferometric configuration, at some lateral position "x" where the spacing decreases (or increases) by $\lambda/4$ (or the phase changes by $\pm \pi/2$), the reflectivity R is zero.

Now we can take into consideration the wavelength chirp $(d\lambda/dx \neq 0)$. We set the maximum reflectivity at the beam center x=0 and zero reflectivity at that x-position where according to equation 1, $\lambda(x) - \lambda(0) \approx FSR$, or free spectral range of the etalon (measured in wavelength units). We get:

$$d(x)/(1+FSR/\lambda(0)) - d(0) = \pm \lambda(0)/4 \quad \text{(equation 4)}$$

or a phase change of $\delta(x)/(1+FSR/\lambda(0)) - \delta(0) = \pm \pi/2$. Some outcoupling interferometer arrangements can be designed by which equation 4 can be fulfilled as these are described below with reference to FIGS. 4a–6c, below.

In preferred embodiments, the material of the plates of the interferometric device of the preferred embodiment is calcium fluoride, magnesium fluoride, and/or fused silica, and alternatively barium fluoride, lithium fluoride and/or strontium fluoride. In an alternative embodiment, a beam expander may be installed before the interferometers of any of the preferred embodiments described herein to expand the beam in the x-direction. Such a beam expander may be one or more prisms or a pair of lenses. The inner surfaces of the plates of the interferometric device can be specially shaped using reactive ion etching (RIE), or simply ion beam etching.

Preferred Embodiment A

Figure 4A:
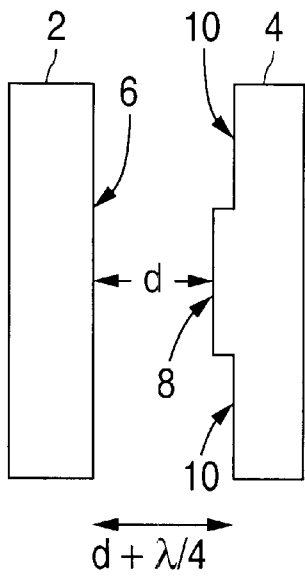
FIG. 4a schematically shows a first output coupling interferometer in accord with a first embodiment.
Figure 4B:
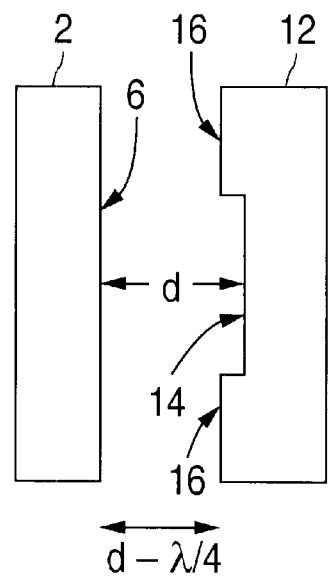
FIG. 4b schematically shows a second output coupling interferometer in accord with a second embodiment.

Preferred embodiment A is shown at FIGS. 4a and 4b. FIG. 4a shows an interferometer for use as an output coupling reflector for an excimer or molecular fluorine laser. The interferometer includes a pair of optical blocks 2 and 4. Reflecting surface 6 of optical block 2 opposes a central reflecting step surface 8 of optical block 4. Reflecting surface 6 of optical block 2 also opposes reflecting side surfaces 10 of optical block 4. The gap spacing d between central reflecting step surface 8 and the reflecting surface 6 is set for maximum reflectivity of an the excimer or molecular fluorine laser beam having a predetermined wavelength. The gap spacing is $d + \lambda/4$ between the reflecting surface 6 and the outer reflecting surfaces 10.

Alternative arrangements may include optical block 2 having the $\lambda/4$ step and optical block 4 having a planar reflecting surface, or each of optical blocks 2 and 4 having a $\lambda/8$ step. Other such alternative arrangements would be understood by those skilled in the art whereby the optical path difference between the reflectivity maximum portions and the reflectivity zero or suppressed portion or portions is around $\lambda/4$.

FIG. 4b shows an alternative interferometer for use as an output coupling reflector for an excimer or molecular fluorine laser to that shown and described with respect to FIG. 4a. The interferometer of FIG. 4b includes a pair of optical blocks 2 and 12. Reflecting surface 6 of optical block 2 opposes a central reflecting recess surface 14 of optical block 12. Reflecting surface 6 of optical block 2 also opposes reflecting side surfaces 14 of optical block 12. The gap spacing d between central reflecting recess surface 14 and the reflecting surface 6 is set for maximum reflectivity of an the excimer or molecular fluorine laser beam having a predetermined wavelength. The gap spacing is $d - \lambda/4$ between the reflecting surface 6 and the outer reflecting surfaces 16.

Again, alternative arrangements may include optical block 2 having the $\lambda/4$ recess and optical block 12 having a planar reflecting surface, or each of optical blocks 2 and 12 having a $\lambda/8$ recess. Other such alternative arrangements are possible whereby the optical path difference between the reflectivity maximum portions and the reflectivity zero or suppressed portion or portions is $\lambda/4$.

Thus, preferred embodiment A is characterized in that the optical path length near the beam center differs by that at the outer regions by $\pm \lambda/4$. Preferably, this is achieved by forming additional coatings at the center region. The substrate of the blocks 2, 4 and/or 12 themselves may be formed with the step(s) or recess(es) described above. Other methods for providing step profiles are described at Giuri (see citation above) such as for use in unstable resonators.

The output coupling interferometer of preferred embodiment A exemplified at FIGS. 4a–4b preferably includes external surfaces of blocks 2, 4 and 12 with antireflection (AR) coatings. As mentioned, many modifications within the scope of preferred embodiment A are conceivable (e.g., two inner surfaces having equal phase jumps of $\pi/4$, or otherwise adding up to phase jumps of $\pi/2$ from the outer regions).

Figure 4C:
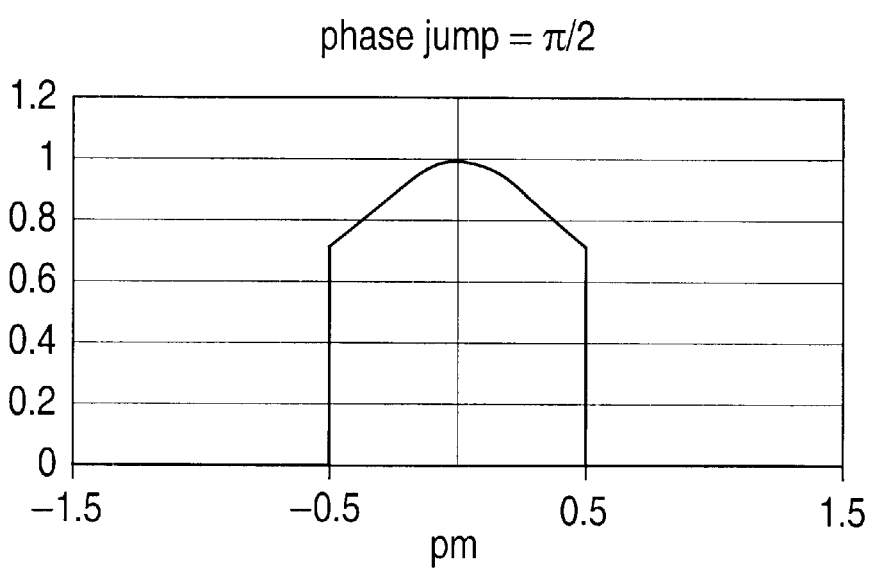

The calculated spectrum of a narrow band KrF-laser using an output coupling interferometer according preferred embodiment A is shown at FIG. 4c. The calculations provide a rough picture of the spectrum of the output beam that could be expected. Advantageously, sidebands and/or outer portions of a central band are suppressed at the boundaries between the central surface 8 or 14 of FIGS. 4a and 4b to the side surfaces 10 and 16, respectively, thereby reducing the spectral purity of the beam in accordance with the object of the invention.

The following calculation is described for obtaining the spectrum shown at FIG. 4c for the embodiments of FIGS. 4a–4b:

We set maximum reflectivity $R_{max}$ at x=0

$$[m+1/2]\cdot\lambda(0)/2 = d(0) \qquad (a)$$

and R=0, e.g., at the position x where e.g., $\lambda(x)=\lambda(0)+FSR$ $$0.5 \cdot m \cdot [\lambda(x)+FSR] = d(x) \qquad (b)$$

$$0.5 \cdot [m \cdot \lambda(0)] \cdot [1+FSR/\lambda(0)] = d(x) \qquad (c)$$

(c)–(a) gives the requirement $$\frac{d(x)}{1+\frac{FSR}{\lambda(0)}} - d(0) = \pm \frac{\lambda(0)}{4}$$

Preferred Embodiment B

Figure 5A:
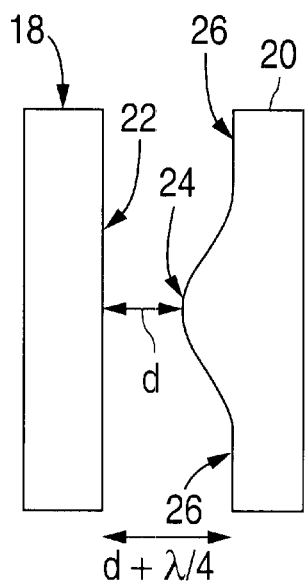
FIG. 5a schematically shows a third output coupling interferometer in accord with a third embodiment.
Figure 5B:
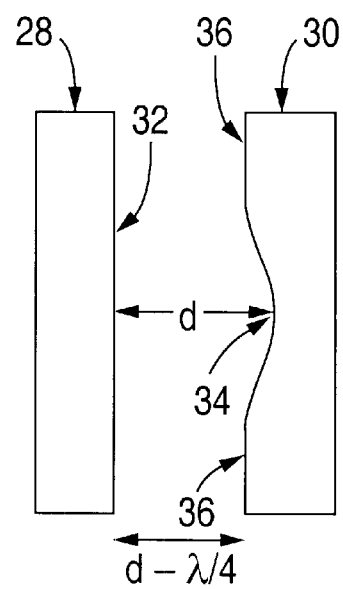
FIG. 5b schematically shows a fourth output coupling interferometer in accord with a fourth embodiment.

The preferred embodiment B is depicted at FIGS. 5a and 5b. FIG. 5a shows an interferometer for use as an output coupling reflector for an excimer or molecular fluorine laser. The interferometer includes a pair of optical blocks 18 and 20. Reflecting surface 22 of optical block 18 opposes a curved, raised central reflecting surface 24 of optical block 20. The curved, raised surface 24 is preferably symmetrical about its center and is further preferably Gaussian in shape. Reflecting surface 22 of optical block 18 also opposes reflecting side surfaces 26 of optical block 20. The gap spacing d between the center, or peak, of curved, raised central reflecting surface 24 and the reflecting surface 22 is preferably set for maximum reflectivity of an the excimer or molecular fluorine laser beam having a predetermined wavelength. The gap spacing reduces gradually over the curved surface 24 until the gap spacing becomes d+λ/4 between the reflecting surface 22 and the outer reflecting surfaces 26.

Alternative arrangements may include optical block 18 having the λ/4 curved, raised portion and optical block 20 having a planar reflecting surface, or each of optical blocks 18 and 20 having opposed λ/8 curved, raised portions. Other such alternative arrangements would be understood by those skilled in the art whereby the optical path difference between the reflectivity maximum portions at the peaks of the curved, raised portions and the reflectivity zero or suppressed portion or portions is λ/4.

FIG. 5b shows an alternative interferometer for use as an output coupling reflector for an excimer or molecular fluorine laser to that shown and described with respect to FIG. 5a. The interferometer of FIG. 5b includes a pair of optical blocks 28 and 30. Reflecting surface 32 of optical block 28 opposes a central reflecting curved, recess surface 34 of optical block 30. The curved, recessed surface 34 is preferably symmetrical about its center and is further preferably Gaussian-shaped. The gap spacing increases along curved recessed portion 34 until reflecting surface 32 of optical block 28 also opposes reflecting side surfaces 36 of optical block 30. The gap spacing d between central reflecting recess surface 34 and the reflecting surface 32 is set for maximum reflectivity at its maximum depth preferably at its center of an the excimer or molecular fluorine laser beam having a predetermined wavelength. The gap spacing gradually reduces along the recess surface 34 until the gap spacing becomes d−λ/4 between the reflecting surface 32 and the outer reflecting surfaces 36.

Again, alternative arrangements may include optical block 28 having the λ/4 curved, recess portion and optical block 30 having a planar reflecting surface, or each of optical blocks 28 and 30 having a recess with maximum depth being λ/8. Other such alternative arrangements are possible whereby the optical path difference between the reflectivity maximum portions and the reflectivity zero or suppressed portion or portions is λ/4 preferably at the point of maximum depth or depths of the recess or recesses.

Thus, preferred embodiment B is characterized in that the optical path length near the beam center differs by that at the outer regions by ±λ/4. The path difference gradually makes this transition between the center and outer regions of the interferometer. The output coupling interferometer of preferred embodiment B exemplified at FIGS. 5a–5b preferably includes external surfaces of blocks 18, 20, 28 and 30 with antireflection (AR) coatings. As mentioned, many modifications within the scope of preferred embodiment B are conceivable (e.g., two inner surfaces having equal phase jumps of π/4 at their maximum or minimum gap spacing, or otherwise adding up to phase jumps of π/2 at their maximum or minimum gap spacing from the outer regions).

Figure 5C:
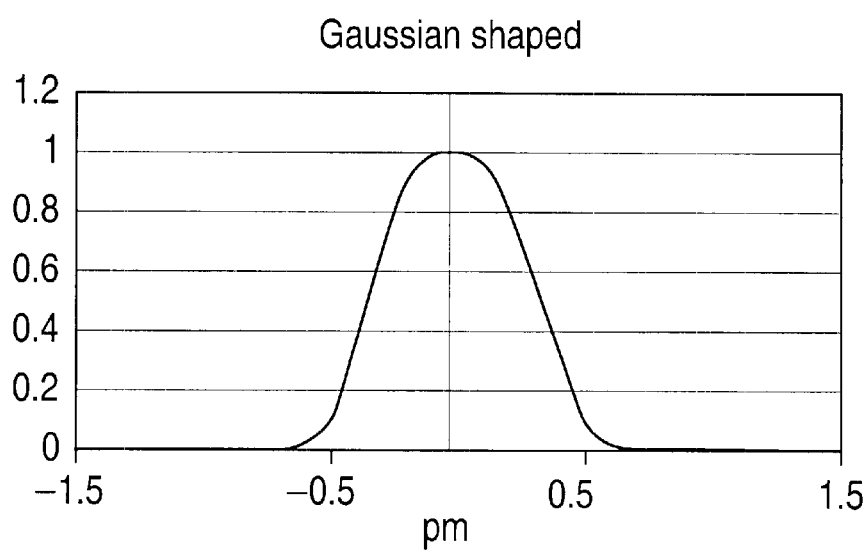

The calculated spectrum of a narrow band KrF-laser using an output coupling interferometer according to preferred embodiment B is shown at FIG. 5c. The calculations provide a rough picture of the spectrum of the output beam that could be expected. The calculations follow those provided above for preferred embodiment A, but are modified according to the curvature of the raised or recess curved portions of the interferometer blocks. Advantageously, sidebands and/or outer portion of a central intensity band are suppressed as the gap spacing changes from the peak at R=maximum out to the boundaries between the central surface 24 or 34 of FIGS. 5a and 5b and the side surfaces 26 and 36, respectively, thereby reducing the spectral purity of the beam in accordance with the object of the invention.

Preferred Embodiment C

Figure 6A:
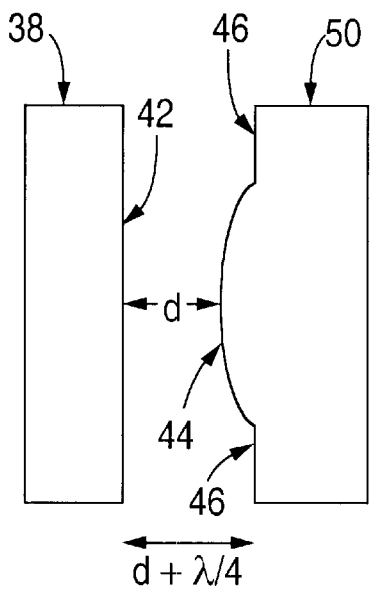
FIG. 6a schematically shows a fifth output coupling interferometer in accord with a fifth embodiment.
Figure 6B:
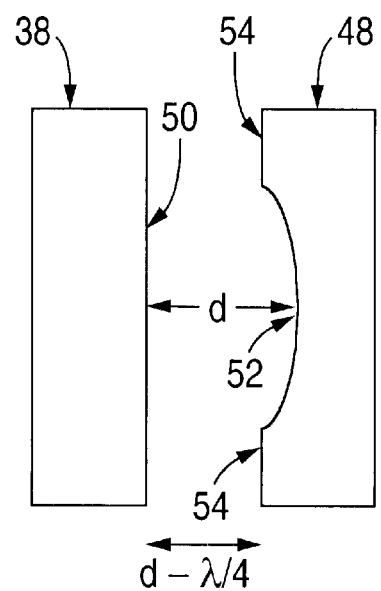
FIG. 6b schematically shows a sixth output coupling interferometer in accord with a sixth embodiment.

The preferred embodiment C is depicted at FIGS. 6a and 6b. FIG. 6a shows an interferometer for use as an output coupling reflector for an excimer or molecular fluorine laser. The interferometer includes a pair of optical blocks 38 and 40. Reflecting surface 42 of optical block 38 opposes a curved, raised central reflecting surface 44 of optical block 40. The curved, raised surface 44 is preferably symmetrical about its center and further is preferably cylindrically shaped. Reflecting surface 42 of optical block 38 also opposes reflecting side surfaces 46 of optical block 40. The gap spacing d between the center, or peak, of curved, raised cylindrical reflecting surface 44 and the reflecting surface 42 is preferably set for maximum reflectivity of an the excimer or molecular fluorine laser beam having a predetermined wavelength. The gap spacing reduces gradually away from the center of the cylindrically-curved surface 44 until the gap spacing becomes d+λ/4 between the reflecting surface 42 and the outer reflecting surfaces 46, where the reflectivity of the interferometer is substantially zero.

Alternative arrangements may include optical block 38 having the λ/4 curved, raised cylindrical central portion and optical block 40 having a planar reflecting surface, or each of optical blocks 38 and 40 having opposed λ/8 curved, raised and opposed cylindrical portions. Other such alternative arrangements would be understood by those skilled in the art whereby the optical path difference between the reflectivity maximum portions at the peaks of the curved, raised portions and the reflectivity zero or suppressed portion or portions is λ/4.

FIG. 6b shows an alternative interferometer for use as an output coupling reflector for an excimer or molecular fluorine laser to that shown and described with respect to FIG. 6a. The interferometer of FIG. 6b includes a pair of optical blocks 38 and 48. Reflecting surface 50 of optical block 38 opposes a central reflecting curved, recessed surface 52 of optical block 48. The curved, recessed surface is preferably symmetrical about its center and further is preferably cylindrically-shaped. The gap spacing decreases away from center along cylindrically-curved recessed portion 52 until reflecting surface 50 of optical block 38 also opposes reflecting side surfaces 54 of optical block 48. The gap spacing d between central reflecting recess surface 52 and the reflecting surface 50 is set for maximum reflectivity at its maximum depth preferably at its center of an the excimer or molecular fluorine laser beam having a predetermined wavelength. The gap spacing gradually reduces along the cylindrical recess surface 52 until the gap spacing becomes d−λ/4 between the reflecting surface 50 and the outer reflecting surfaces 54.

Again, alternative arrangements may include optical block 38 having the λ/4 curved, recessed portion and optical block 48 having a planar reflecting surface, or each of optical blocks 38 and 48 having a recess with maximum depth being λ/8. Other such alternative arrangements would be understood by those skilled in the art whereby the optical path difference between the reflectivity maximum portions and the reflectivity zero or suppressed portion or portions is λ/4 preferably at the point of maximum depth or depths of the recess or recesses.

Thus, preferred embodiment C is characterized in that the optical path length near the beam center differs by that at the outer regions by ±λ/4. The path difference gradually makes this transition along a cylindrical raised or recessed surface of at least one of two optical blocks between the center and outer regions of the interferometer. The output coupling interferometer of preferred embodiment C exemplified at FIGS. 6a–6b preferably includes external surfaces of blocks 38, 40 and 48 with antireflection (AR) coatings. As mentioned, many modifications within the scope of preferred embodiment C are conceivable (e.g., two inner surfaces having equal phase jumps of π/4 at their maximum or minimum gap spacing, or otherwise adding up to phase jumps of π/2 at their maximum or minimum gap spacings preferably at their center from outer regions).

Figure 6C:
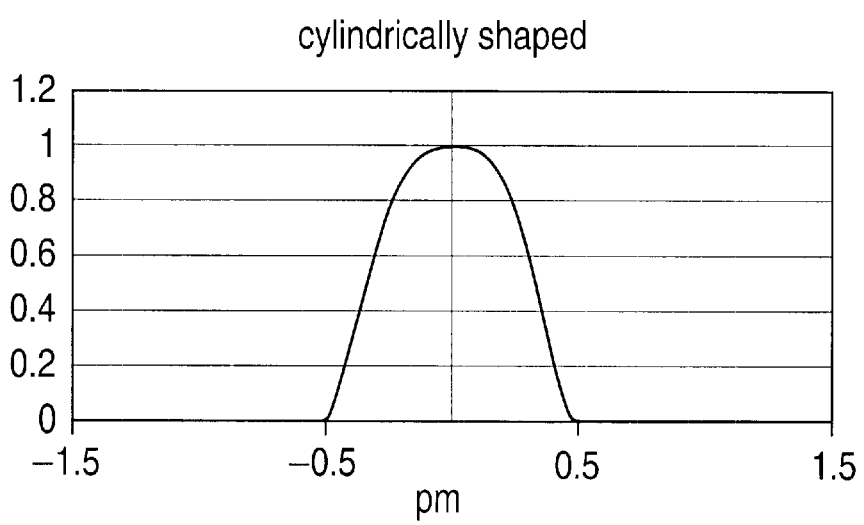

The calculated spectrum of a narrow band KrF-laser using an output coupling interferometer according to preferred embodiment C is shown at FIG. 6c. The calculations provide a rough picture of the spectrum of the output beam that could be expected. The calculations follow those provided above for preferred embodiment A, but are modified according to the cylindrical curvature of the raised or recess curved portions of the interferometer blocks. Advantageously, sidebands and/or outer portions of a central intensity band are suppressed as the gap spacing changes from the peak at R=maximum out to the boundaries between the central surface 44 or 52 of FIGS. 6a and 6b and the side surfaces 46 and 54, respectively, thereby reducing the spectral purity of the beam in accordance with the object of the invention.

Embodiment C is similar to embodiment B, but is easier for preparation. The inner surfaces are preferably uncoated and the outer surfaces are preferably antireflection (AR)-coated. At least one inner surface is cylindrically curved along the x-axis. The radius of curvature is preferably selected to coincide with the diameter of the beam profile, just as the central raised or recessed portions of any of the preferred embodiments is selected to extend just to suppress the tails of the spectral distribution of the beam without suppressing too much of the main portion of the beam which would result in greatly reduced gain. The radius of curvature r can be determined by the following estimation:

$$d(x)=d(0)+\lambda/4 \quad \text{(equation 5)}$$

where x is nearly given (equation 1) by x≈0.7 FSR/(dλ/dx). With FSR=1.6 pm and (dλ/dx)=1.24 pm/mm we get x≈1 mm. Based on equation 5, the radius of curvature r is given by $$r=2\,x^2/\lambda \quad \text{(equation 6)}$$

With λ=248 nm, we get a preferred radius of curvature of r=8 m.

Figure 6D:
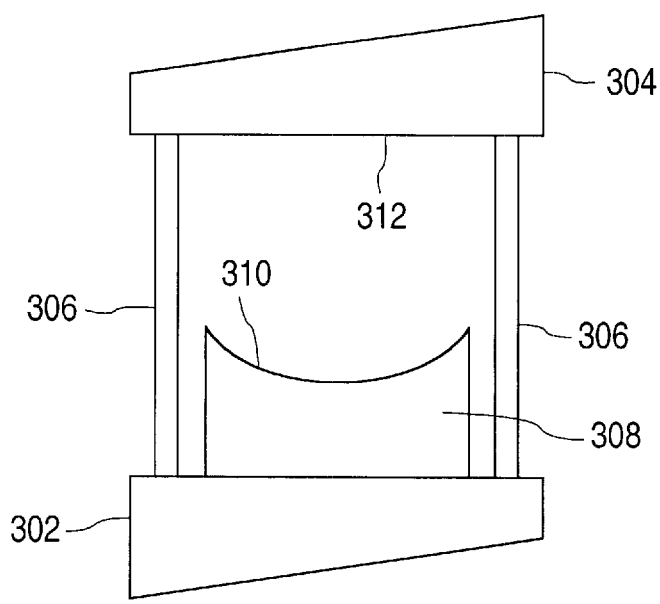
FIG. 6d schematically shows a seventh output coupling interferometer in accord with a seventh embodiment.
Figure 6E:
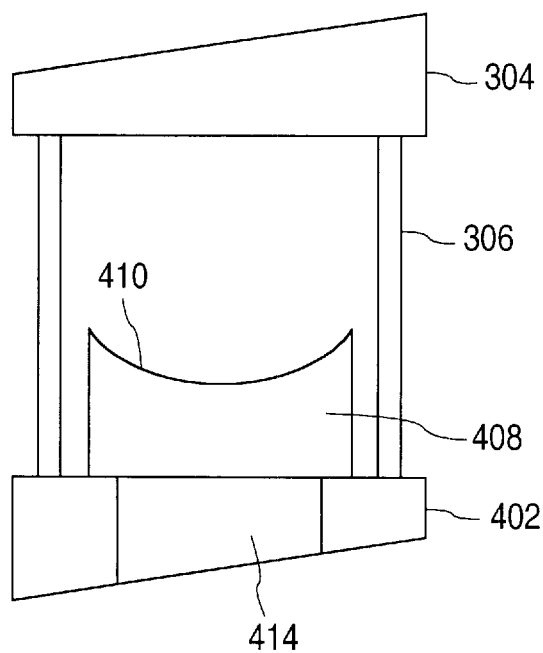
FIG. 6e schematically shows a eighth output coupling interferometer in accord with a eighth embodiment.

FIGS. 6d and 6e schematically illustrate further preferred embodiments of output coupling or transmissive interferometers for use with a line-narrowed excimer or molecular fluorine laser system. The principles of the embodiments shown at FIGS. 6d and 6e may be combined with any of the other preferred embodiments described herein. The output coupling interferometer of FIG. 6d includes a first optical block 302 and a second optical block 304 coupled together with a spacer component 306 which may be a single or multiple piece spacer component 306. The optical block 302 has a reflecting optical element 308 coupled thereto. Element 308 includes a reflecting surface 310 facing optical block 304. Optical block 304 also has a reflecting optical surface 312 opposing the reflecting surface 310 of optical block 302 and forming a preferred interferometer.

The interferometer of FIG. 6d may be a modification of an etalon, wherein the interferometer includes an etalon (optics blocks 302 and 304 and spacer element 306) with optical element 308 coupled thereto, e.g., using a transmissive adhesive or fitting into a notch in block 302 or otherwise bolted in or fastened with a fastener of some kind. The surface of block 302 opposing surface 312 and having the element 308 coupled thereto, in this case, would not have to be reflective and is preferably not reflective.

The reflecting surface 310 is shown in FIG. 6d having a smooth curvature. Preferably, the curvature is cylindrical and alternatively spherical or Gaussian. The surface 310 may have an aspheric or acylindrical shape such that the radius of curvature varies over the surface 310. The surface 310 preferably has this curvature over its entire surface 310. An advantage is ease of manufacture, and a motivating advantage is the suppression of the side bands and/or outer portions of a central band of a narrow-band emission of an excimer or molecular fluorine laser, as described above.

FIG. 6e shows an alternative embodiment of an outcoupling interferometer for an excimer or molecular fluorine laser system. The interferometer of FIG. 6e includes block 304 and spacer element 306 as in FIG. 6d. The interferometer of FIG. 6e also includes optical block 402 having a slot for fitting a coupling segment 414 of reflective element 408. Coupling segment 414 of element 408 preferably just fits into the slot defined in the optical block 402 such that no further coupling devices or adhesives are used. The reflecting surface 410 is preferably the same as that described above with respect to FIG. 6d. Advantageously, the optical path of light transmitting optical element 408 may not cross an optical interface between elements 402 and 408, as would occur with the embodiment of FIG. 6d, even though the interface of elements 302 and 308 would be index matched as well as possible.

Figure 6F:
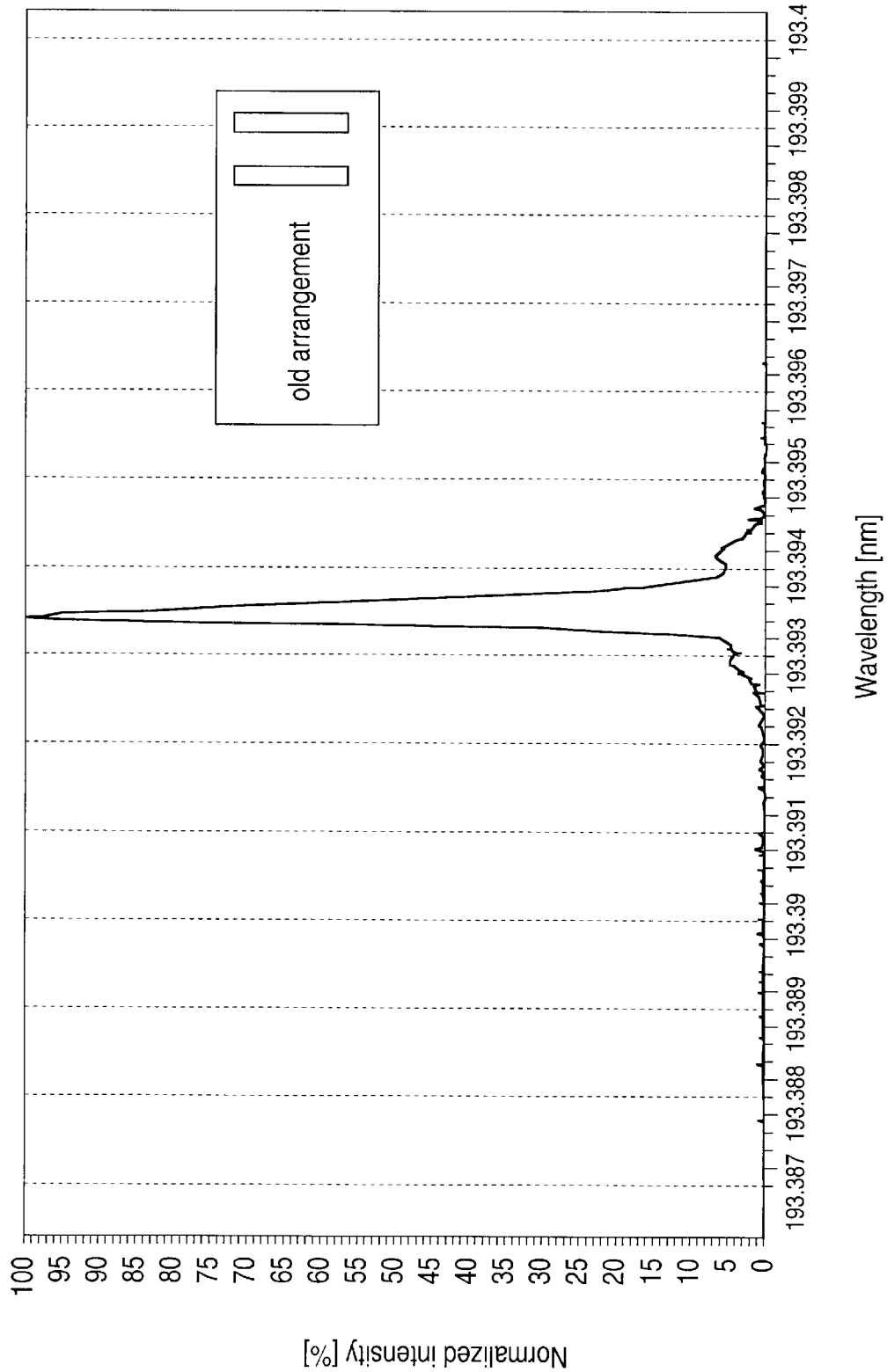
FIG. 6f shows a measured spectrum of an excimer laser including an etalon output coupler.
Figure 6G:
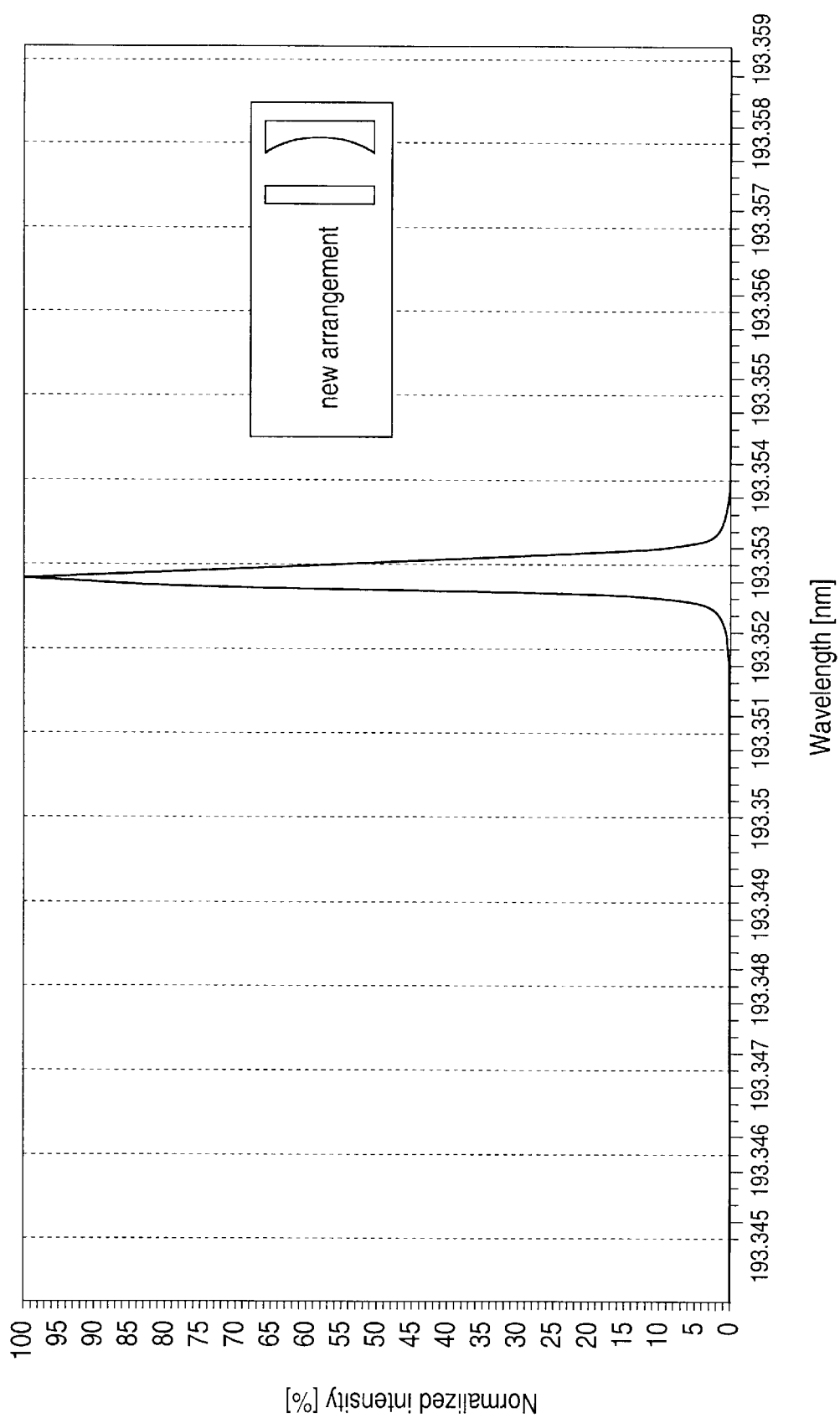
FIG. 6g shows a measured spectrum of an excimer laser including the eighth output coupling interferometer of FIG. 6e.

FIGS. 6f and 6g illustrate advantages of using the outcoupling interferometer of any of FIGS. 6d or 6e. The measured emission spectrum shown in FIG. 6f is for an ArF excimer laser having an etalon outcoupler and grating-based line-narrowing module (e.g., also including a multi-prism beam expander). Side bands are shown on either side of a central peak around 193.3935 nm. The presence of these sidebands greatly reduces the spectral purity of the laser emission. The measured spectrum of FIG. 6g is for a ArF laser having an output coupling interferometer according to the embodiment of FIG. 6e, described above. The sidebands appearing in the spectrum of FIG. 6f are noticeably and advantageously missing in the measured spectrum of FIG. 6g, and therefore, the spectral purity of the ArF emission shown in FIG. 6g is far greater than that of the emission of FIG. 6f.

It is understood by those skilled in the art that the preferred Gaussian and cylindrical shapes described above with respect to embodiments B and C, and the step or recess of embodiment A are illustrative shapes. For example, any of a wide variety of curvatures may be used that are preferably symmetrical about their center and have a reflectivity maximum at that center portion and then curve to effect a change in the reflectivity to suppress side bands and/or outer portion of a central peak. The shape may be a series of two or more connected straight portions or a combination of one or more straight portions and one or more curved portions. For example, the center portion may be triangularly or trapezoidally-shaped, or may have a central curved portion that connects with the outer R=0 portions via straight connectors.

In further aspects of the invention, a narrow band excimer laser containing an output coupling interferometer and grating-based line-narrowing optics located at the rear of the laser are synchronized to maximize performance. In another embodiment, any of the interferometers described herein may be disposed within the laser resonator between resonator reflectors, i.e., not also serving as a highly reflecting resonator reflector or outcoupler as is preferred herein. In that case, the interferometer may be preferably transmissive. The transmissive interferometer would be aligned at an angle within the resonator so that the beam reflected from the transmissive interferometer would be reflected outside the acceptance angle of the resonator. The preferred embodiments below relate to synchronization procedures of the narrow band unit and an outcoupling etalon or other interferometric device as described herein, although the interferometric device, being either an etalon or device with non-parallel reflecting surfaces in the embodiments below, may be a highly reflective (HR) resonator reflector or may be a transmissive intracavity component.

Figure 7:
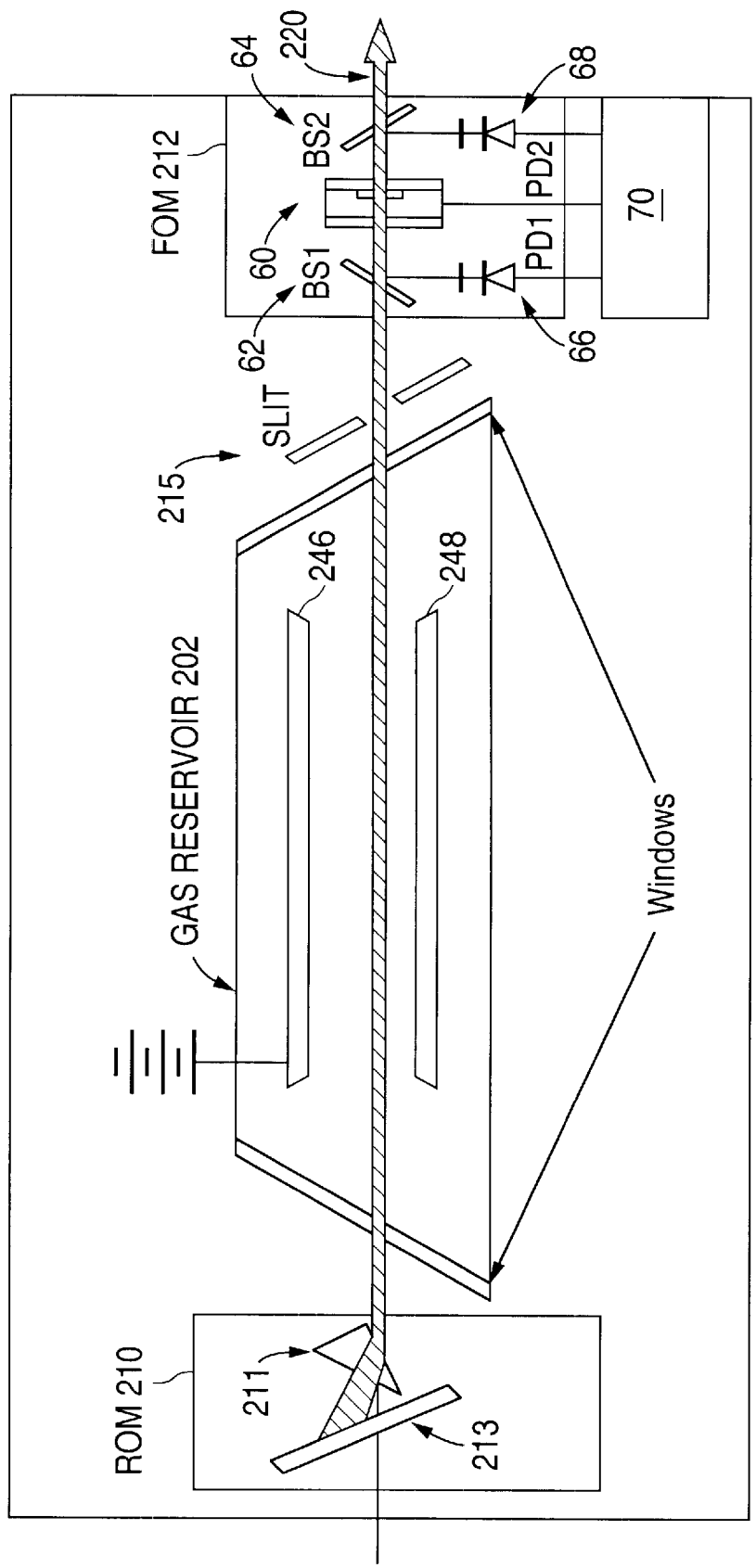
FIG. 7 schematically shows an excimer or molecular fluorine laser resonator including an output coupling interferometer in accord with any of the first through sixth embodiments, and further including a control unit for tuning the interferometer.

FIG. 7 schematically shows an excimer or molecular fluorine laser resonator including an output coupling interferometer in accord with any of the preferred or alternative embodiments described above. In addition, the synchronization procedures described herein may be applied with systems including conventional etalon output couplers such as has been described above and/or that may be described in the references cited above and incorporated by reference into this application.

The resonator shown in FIG. 7 includes a gas reservoir or discharge chamber 202 and a pair of main discharge electrodes 246, 248 for energizing the gases in the discharge chamber 202 by electrical discharge excitation. The chamber 202 has windows 203 on either end and sits between a rear optics module 210 and a front optics module 212. The rear optics module 210 shown includes a beam expander 211 and a retro-reflection grating 213. A slit 215 is shown disposed between the chamber 202 and the front optics module 212.

The front optics module 212 includes an output coupling interferometer 60. The interferometer 60 has a first beam splitter 62 and a second beam splitter 64 in front of and behind it along the optical path of the output beam 220. As will be seen in the preferred embodiments that follow, one or both of the first and second beam splitters 62 and 64, respectively, may be used. The first beam splitter 62 shown in FIG. 7 is for reflecting a portion of the beam reflected by the interferometer 60 to a first photodiode 66. The second beam splitter 64 shown in FIG. 7 is for reflecting a portion of the beam transmitted by the interferometer 60 to a second photodiode 68. An interferometer control unit 70 is shown in FIG. 7 for receiving signals from the first and second photodiodes 66 and 68, respectively, and for controlling the tuning of the interferometer 60. Further details of the preferred excimer or molecular fluorine laser resonator, and the preferred overall laser system, are provided below with reference to FIG. 12.

The output coupling interferometer 60 located inside of the front optics module 212 of FIG. 7 is adjusted as controlled by the control unit 70 to reflect radiation at or very near a spectral maximum produced by the echelle grating 213. This grating 213 is located inside the narrow band unit of the rear optics module 210 of FIG. 7. Synchronization in this sense means the interferometer 60 has its maximum of reflection at or near the maximum of the spectral distribution of the intracavity laser radiation produced by the narrow band optics of the rear optics module 210, or at another selected relative spectral position. Several preferred embodiments are disclosed for tuning the interferometer 60 to match the "maximum" wavelength selected by the rear optics module 210.

There are generally three synchronization techniques that are particularly preferred:
1) A first preferred technique includes tuning of the outcoupling interferometer 60 to get maximum intracavity power reflection. This entails a minimum degree of outcoupling and minimized intracavity losses.
2) A second preferred technique includes tuning of the outcoupling interferometer 60 to get maximum intensity of interference fringes behind a monitor etalon disposed where the second photodiode 68 is shown in FIG. 7.
3) A third preferred technique includes tuning of the outcoupling interferometer 60 and detection of the reflected (or transmitted) light by a position-sensitive detector (e.g., double- or quadrant photodiode) disposed where either of the first or second photodiodes 66 or 68, respectively, are shown in FIG. 7.

Preferred Embodiment 1

Figure 8A:
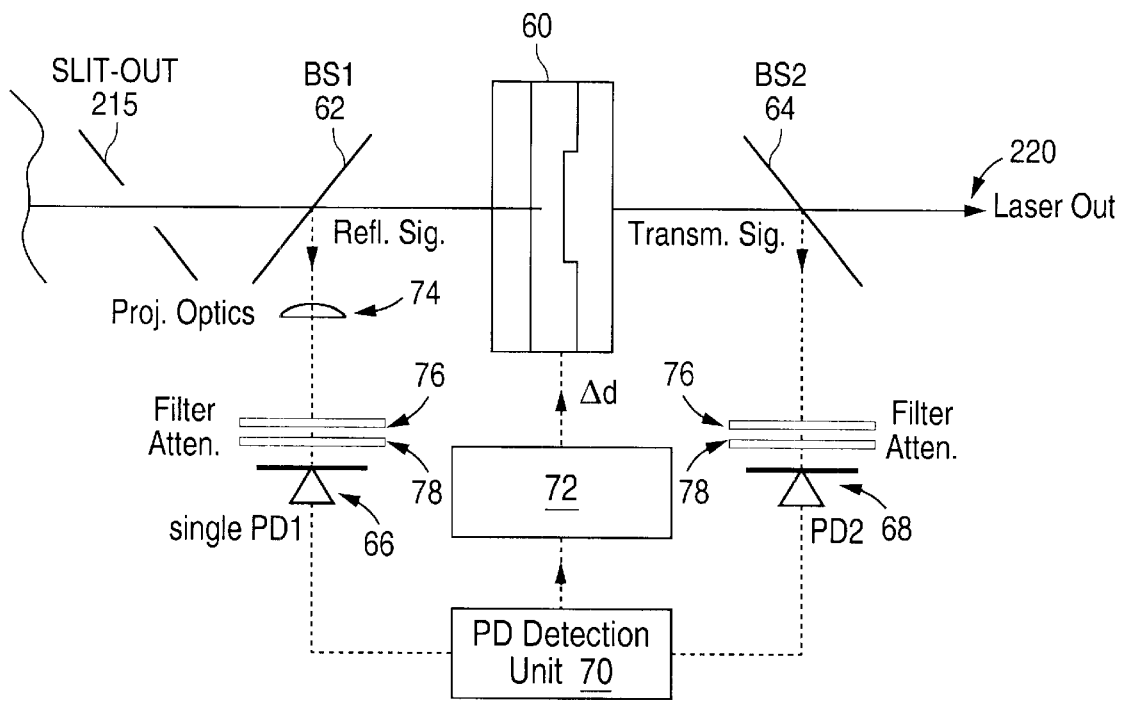
FIG. 8a schematically shows a first preferred embodiment of the control unit of FIG. 7.
Figure 8B:
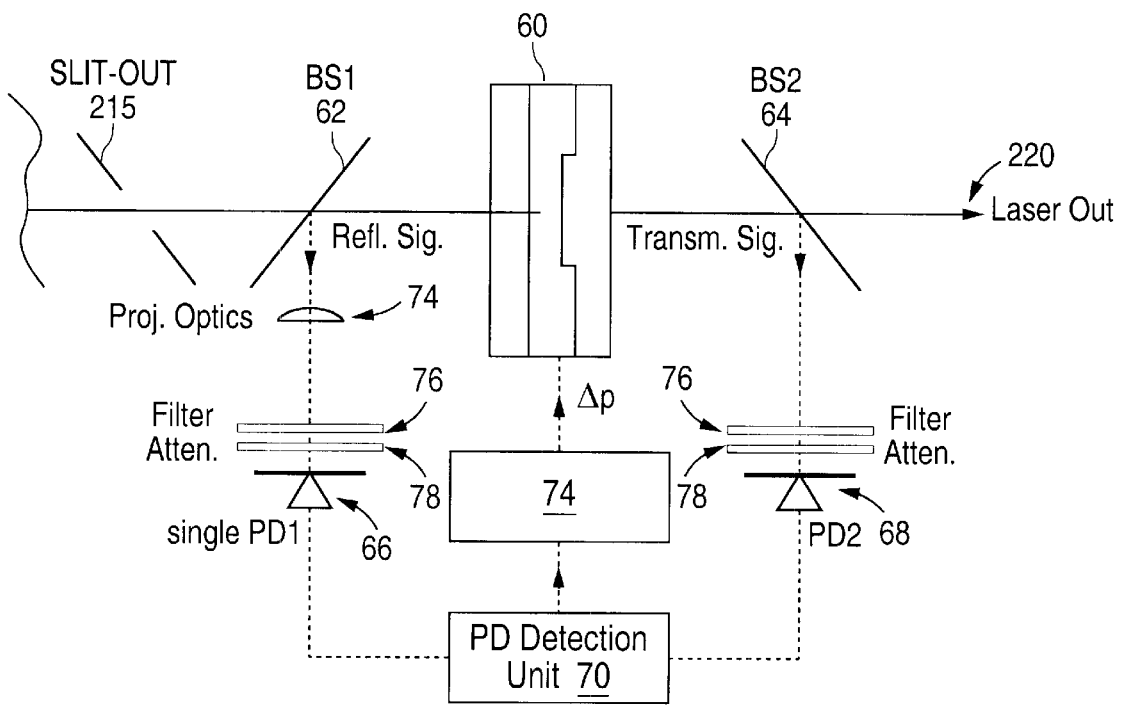
FIG. 8b schematically shows a second preferred embodiment of the control unit of FIG. 7.

A first preferred embodiment, or preferred embodiment 1, of the front optics module 212 for realizing the first preferred synchronization technique is schematically depicted at FIGS. 8a and 8b. Referring to FIG. 8a, the front optics module 212 receives a beam via the slit 215 from the discharge chamber 202 (not shown) and rear optics module 210 (not shown). The beam is partially reflected and partially transmitted at the output coupling interferometer 60, which is illustratively shown as having the optics blocks 2 and 4 of FIG. 4a.

The reflected beam is partially reflected at beam splitter 62. The remainder of the beam reflected by the interferometer 60 re-enters the discharge chamber 202 (not shown) en route to the rear optics module 210 (not shown). The beam portion reflected at the beam splitter 62 preferably passes through each of projection optics 74, a filter 76 and an attenuator 78 before being detected at the first photodiode 66.

The transmitted beam is partially reflected at beam splitter 64. The remainder of the beam transmitted by the interferometer 60 passes out of the resonator as the output laser beam 220 of the excimer or molecular fluorine laser system, preferably en route to an applications process such as to an imaging system for photolithography or for TFT annealing or micro-machining or other industrial process. The beam portion reflected at the beam splitter 64 preferably passes through a filter 76 and attenuator 78 before being detected at the second photodiode 68.

The control unit 70, also referred to as a photodiode detection unit, receives signals from each of the first and second photodiodes 66 and 68, respectively. The control unit 70 signals a piezo control unit 72 for tuning the interferometer 60 based on the signals received from the first and second photodiodes 66 and 68, respectively. The embodiment shown at FIG. 8b is the same as that shown at FIG. 8a except that a pressure control unit 74 is used for tuning the interferometer 60.

With respect to the preferred embodiment 1 of the front optics module 212, the beamsplitter 62 reflects a portion of the radiation reflected at the output coupling interferometer 60 to the first photodiode 66. The first photodiode 66 detects the reflected power. The second photodiode 68 is used for detection of the outcoming pulse energy, which is maintained nearly constant when the laser is operated in an energy-stabilized mode. The slit 215, having its slit edges preferably adjusted parallel to the long axis of the beam profile, is disposed in the optical pathway between the discharge chamber 202 and the beamsplitter 62. The slit 215 advantageously serves to reduce the side modes before the beam encounters the interferometer 60. As discussed, a main difference between the embodiments shown in FIGS. 8a and 8b is that the free spectral range of the interferometer 60 of FIG. 8a is piezo-controlled and the free spectral range of the interferometer 60 of FIG. 8b is pressure-controlled. Any of the embodiments described herein may use piezo or pressure-controlled tuning of the interferometer 60 (see also FIGS. 9a–9b, 10a–10b and 11, e.g.).

Preferred Embodiment 2

Figure 9A:
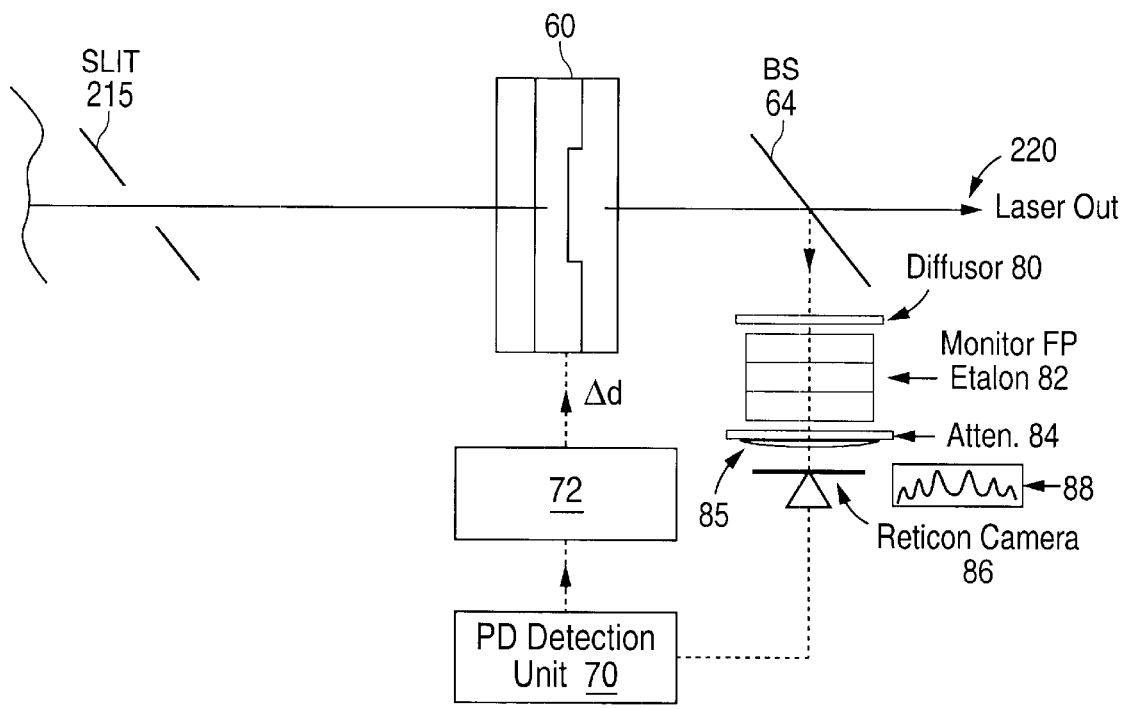
FIG. 9a schematically shows a third preferred embodiment of the control unit of FIG. 7.
Figure 9B:
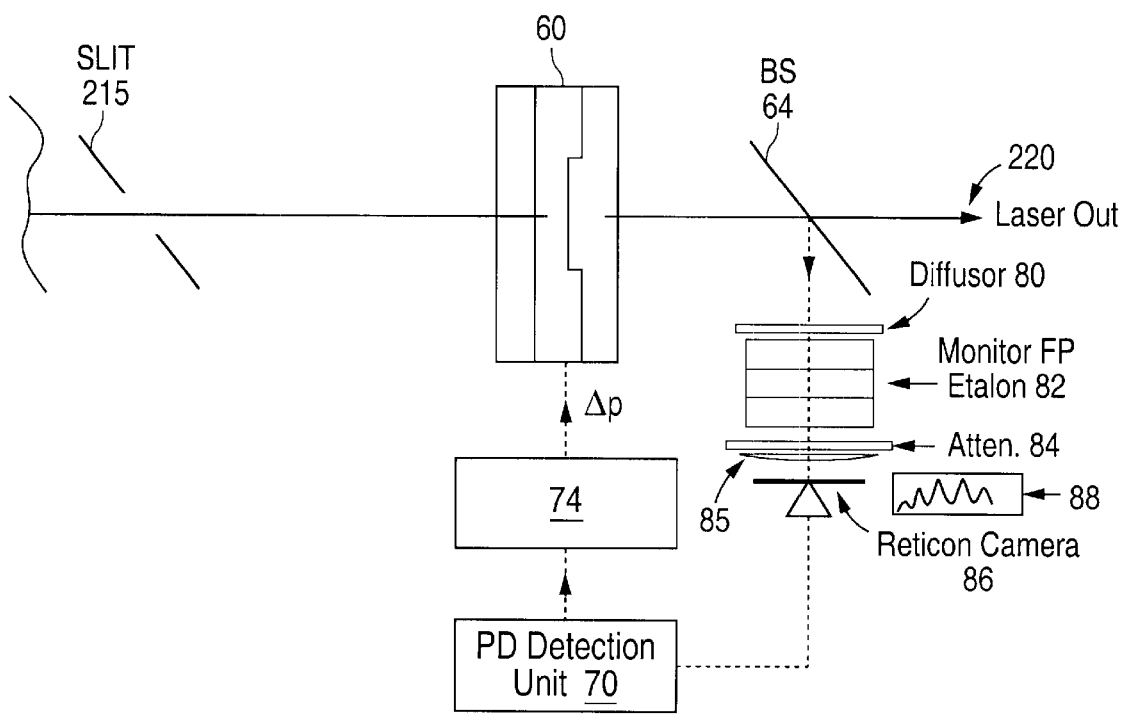
FIG. 9b schematically shows a fourth preferred embodiment of the control unit of FIG. 7.

A second preferred embodiment, or preferred embodiment 2, of the front optics module 212 for realizing the second preferred synchronization technique is schematically depicted at FIGS. 9a and 9b. The second preferred embodiment includes the interferometer 60, beam splitter 64, control unit 70 and either the piezo or pressure tuning unit 72 or 74 as shown in FIGS. 9a and 9b, respectively, each being preferably the same as already described above with respect to the first embodiment of FIGS. 8a and 8b, respectively. In this second embodiment, the beam portion reflected at the beam splitter 64 preferably passes through a diffusor before encountering a monitor Fabry-Perot etalon 82. An attenuator 84 and imaging optics 85 are disposed after the monitor etalon 82. An array detector or camera 86 is disposed after the monitor etalon 82 to capture images 88 of its transmitted fringe spectrum. The control unit 70 receives a signal from the camera 86 used for tuning the interferometer 60.

With respect to the embodiments of FIGS. 9a and 9b, a portion of the radiation transmitted by the interferometer 60 is reflected by beamsplitter 64 to the system including the monitor etalon 82 which preferably includes the Fabry Perot etalon 82, the diffusor 80, imaging optics 85 and, e.g., a CCD-camera 86 or photodiode array or other position sensitive image detector. The CCD-camera 86 detects the interference fringes 88 behind the Fabry Perot etalon 82. The outcoupling interferometer 60 is tuned to get maximum intensity of the fringes.

Preferred Embodiment 3

Figure 10A:
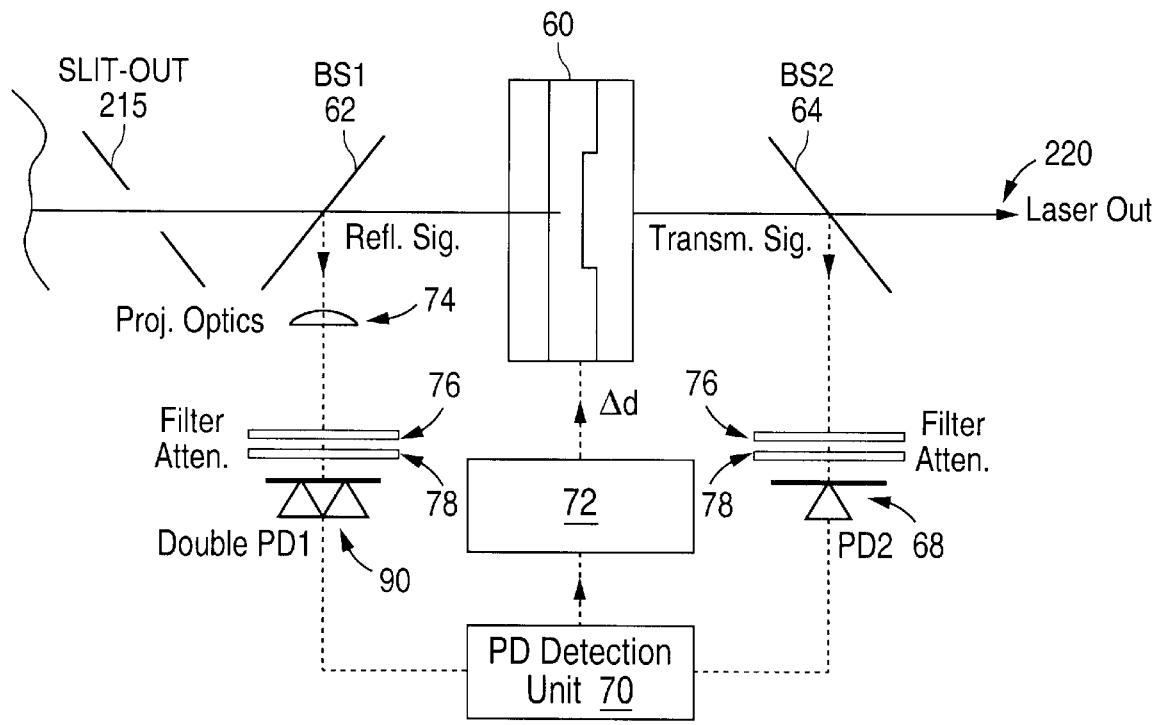
FIG. 10a schematically shows a fifth preferred embodiment of the control unit of FIG. 7.
Figure 10B:
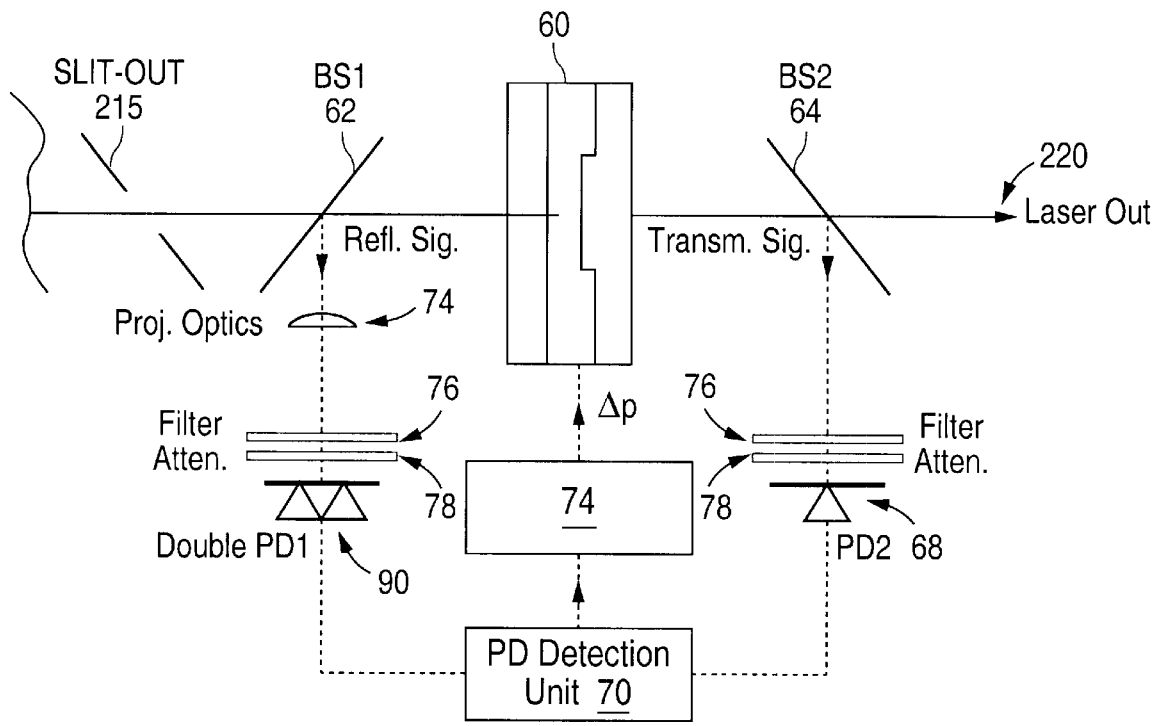
FIG. 10b schematically shows a sixth preferred embodiment of the control unit of FIG. 7.

A third preferred embodiment, or preferred embodiment 3, of the front optics module 212 for realizing the third preferred synchronization technique is schematically depicted at FIGS. 10a and 10b. The optical system is similar to that of preferred embodiment 1 referring to FIGS. 8a and 8b (see above), and the description of the same elements will not be repeated here. The first photodiode 66 of FIGS. 8a and 8b is exchanged by a position-sensitive detector 90 (e.g., a double-or quadrant photodiode). An advantage of preferred embodiment 3 in comparison to preferred embodiments 1 and 2 is that the double- or quadrant photodiode 90 delivers additional information about the direction of the detuning of the interferometer 60.

Figure 11:
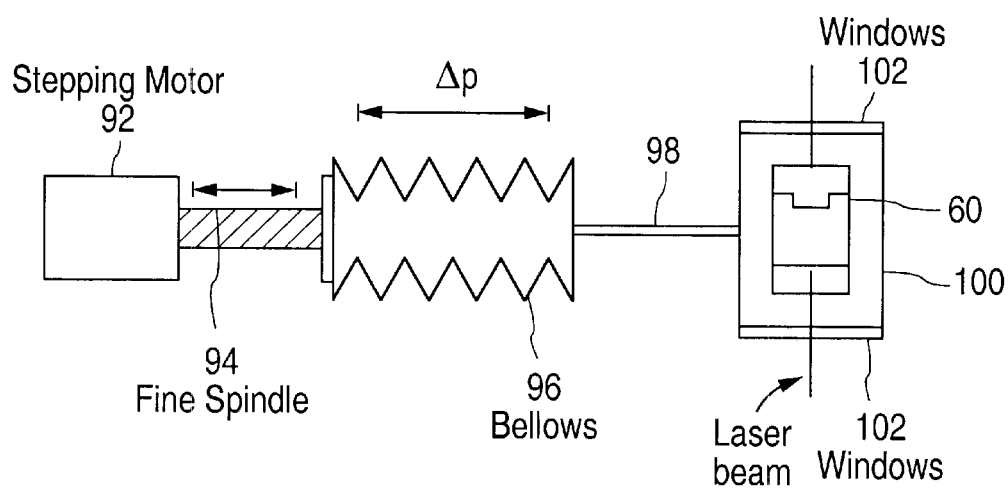
FIG. 11 shows a pressure control unit for a pressure-tuned output coupling interferometer in accord with a preferred embodiment.
Figure 3A:
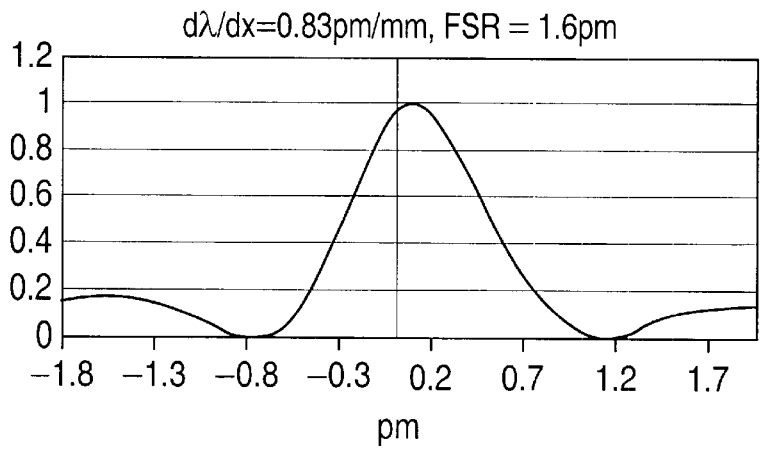
FIG. 3a shows a first calculated spectrum of an output beam of a conventional KrF excimer laser having a grating and an etalon output coupler.
Figure 3B:
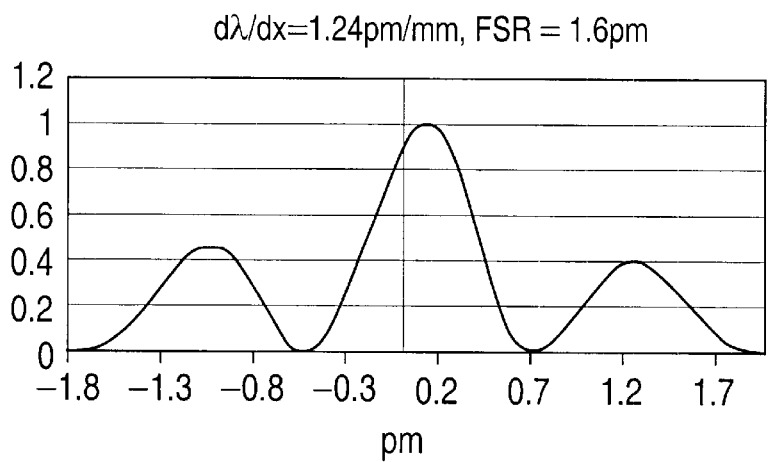
FIG. 3b shows a second calculated spectrum of an output beam of a conventional KrF excimer laser similarly configured as that for calculating the spectrum of FIG. 3a, except that it has a grating with higher spatial dispersion.
Figure 3C:
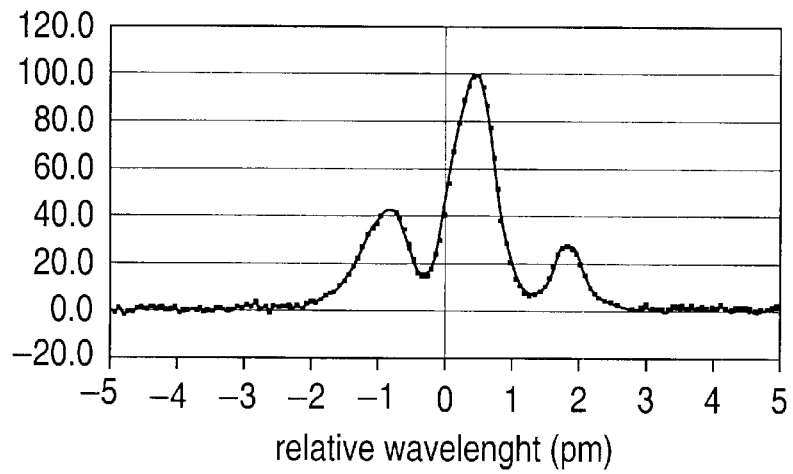
FIG. 3c shows a measured spectrum of an output beam of a conventional KrF excimer laser having the grating of FIG. 3b.

FIG. 11 schematically shows a preferred embodiment for a pressure tuning unit 74 for pressure tuning the output coupling interferometer 60, for use with any of the embodiments shown in FIGS. 8b, 9b or 10b. The preferred pressure tuning assembly includes a stepping motor 92, a fine spindle 94, a bellows 96 and a gas connector 98 to an interferometer housing 100 having windows for transmitting the laser beam. The stepper motor 92 or any other motor drives an inert gas filled bellow 96, wherein the gas is preferably nitrogen or alternatively a noble gas such as argon or helium. The bellows 96 is fluidly connected with the sealed-off housing 100 containing the interferometer 60. As the volume in the bellows 96 is adjusted, the pressure in the bellows 96 and in the housing 100, and particularly in the gap between the optics blocks of the interferometer 60, changes accordingly.

Any of the above embodiments may be modified so that the interferometer serves as a highly reflective resonator reflector or as a transmissive component located within the resonator between a pair of resonator reflectors. When used as a transmissive component, a central transmission maximum would be tuned substantially to a maximum intensity of the beam incident upon the interferometer, and the interferometer may be located in either the front optics module 212 before a partially reflective output coupling mirror, or in the rear optics module 210 between the discharge chamber 202 and grating 213 or a highly reflective mirror. The interferometer in this case is offset at an angle to the beam so that the beam reflected from the interferometer is reflected outside the acceptance angle of the resonator. In this respect, the interferometer may be rotationally-tuned or pressure-tuned. With respect to beam monitoring according to the embodiments of FIGS. 7–10b, this reflected beam may directly impinge upon a photodetector without a beam splitter, while the transmitted beam would be reflected from a beam splitter before being incident upon a photodetector. Only a single photodetector may be used if the embodiments of FIGS. 9a and 9b are modified for use with the transmissive interferometer.

The object of the invention set forth above is thus met. The details of the front optics module 212 and particularly relating to the output coupling interferometer 60 of the preferred embodiments may be advantageously used to achieve an excimer or molecular fluorine laser having improved spectral purity by suppressing side bands and/or outer portions of a central interferometric peak of the laser beam for such industrial applications as microlithography, TFT annealing and micromachining, among others.

Overall Laser System

Figure 12:
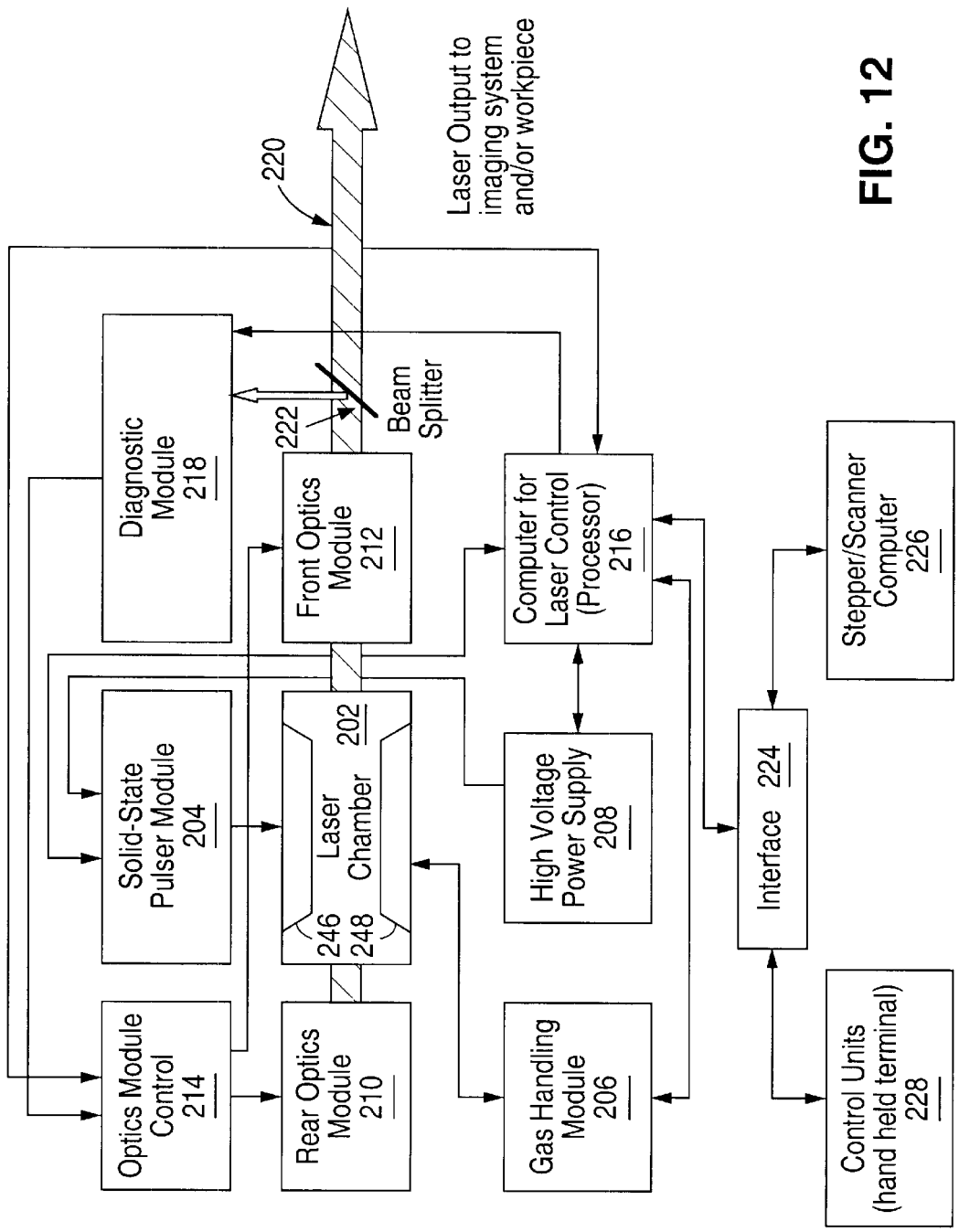
FIG. 12 shows an excimer or molecular fluorine laser system in accord with a preferred embodiment.

FIG. 12 schematically illustrates an overall excimer or molecular fluorine laser system according to a preferred embodiment which preferably includes the advantageous features described above with reference to FIGS. 1–11. Referring to FIG. 12, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 12 to meet the requirements of that application. For this purpose, alternative DUV or VUV laser system and component configurations are described at U.S. patent application Ser. Nos. 09/317,695, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 09/791,431, No. 60/204,095, Ser. Nos. 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,285,701, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 12 generally includes a laser chamber 202 (or laser tube including a heat exchanger and fan for circulating a gas mixture within the chamber 202 or tube) having a pair of main discharge electrodes 203 connected with a solid-state pulser module 204, and a gas handling module 206. The gas handling module 206 has a valve connection to the laser chamber 202 so that halogen, any active rare gases and a buffer gas or buffer gases, and optionally a gas additive, may be injected or filled into the laser chamber, preferably in premixed forms (see U.S. patent application Ser. Nos. 09/513,025, 09/780,120, 09/734,459 and 09/447,882, which are assigned to the same assignee as the present application, and U.S. Pat. Nos. 4,977,573, 4,393,505 and 6,157,662, which are each hereby incorporated by reference. The solid-state pulser module 204 is powered by a high voltage power supply 208. A thyratron pulser module may alternatively be used. The laser chamber 202 is surrounded by optics module 210 and optics module 212, forming a resonator. The optics modules 210 and 212 may be controlled by an optics control module 214, or may be alternatively directly controlled by a computer or processor 216, particular when line-narrowing optics are included in one or both of the optics modules 210, 212, such as is preferred when KrF, ArF or $F_2$ lasers are used for optical lithography.

Processor Control

The processor 216 for laser control receives various inputs and controls various operating parameters of the system. A diagnostic module 218 receives and measures one or more parameters, such as pulse energy, average energy and/or power, and preferably wavelength, of a split off portion of the main beam 220 via optics 222 for deflecting a small portion of the beam toward the module 218, such as preferably a beam splitter module 222. The beam 220 is preferably the laser output to an imaging system (not shown) and ultimately to a workpiece (also not shown) such as particularly for lithographic applications, and may be output directly to an application process. The laser control computer 216 may communicate through an interface 224 with a stepper/scanner computer, other control units 226, 228 and/or other external systems.

The processor or control computer 216 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to the wavefront compensation such as values of the bandwidth, and may control the wavefront compensation performed by a wavefront compensation optic in a feedback loop by sending signals to adjust the pressure(s) and/or curvature(s) of surfaces associated with the wavefront compensation optic. The processor 216 also controls the line narrowing module to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas handling module 206 which includes gas supply valves connected to various gas sources. Further functions of the processor 216 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 12, the processor 216 preferably communicates with the solid-state or thyratron pulser module 204 and HV power supply 208, separately or in combination, the gas handling module 206, the optics modules 210 and/or 212, the diagnostic module 218, and an interface 224. The laser resonator which surrounds the laser chamber 202 containing the laser gas mixture includes optics module 210 including line-narrowing optics for a line narrowed excimer or molecular fluorine laser, which may be replaced by a high reflectivity mirror or the like in a laser system wherein either line-narrowing is not desired, or if line narrowing is performed at the front optics module 212, or a spectral filter external to the resonator is used for narrowing the linewidth of the output beam.

Solid State Pulser Module

The laser chamber 202 contains a laser gas mixture and includes one or more preionization units (not shown) in addition to the pair of main discharge electrodes 203. Preferred main electrodes 203 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent application Ser. Nos. 09/922,241 and 09/532,276 (sliding surface) and Ser. Nos. 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebraushmuster DE 295 21 572 U1, all of the above patents and patent applications being hereby incorporated by reference.

The solid-state or thyratron pulser module 204 and high voltage power supply 208 supply electrical energy in compressed electrical pulses to the preionization and main electrodes 203 within the laser chamber 202 to energize the gas mixture. Components of the preferred pulser module and high voltage power supply are described above, and further details may be described at U.S. patent application Ser Nos. 09/640,595, 09/838,715, No. 60/204,095, Ser. Nos. 09/432,348 and 09/390,146, and U.S. Pat. No. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Resonator, General

The laser resonator which surrounds the laser chamber 202 containing the laser gas mixture includes optics module 210 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 212, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715,803 and No. 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 60/212,301, which is assigned to the same assignee as the present application and is hereby incorporated by reference).

The laser chamber 202 is sealed by windows transparent to the wavelengths of the emitted laser radiation 220. The windows may be Brewster windows or may be aligned at another angle, e.g., 5°, to the optical path of the resonating beam. One of the windows may also serve to output couple the beam or as a highly reflective resonator reflector on the opposite side of the chamber 202 as the beam is outcoupled.

Diagnostic Module

After a portion of the output beam 220 passes the outcoupler of the optics module 212, that output portion preferably impinges upon a beam splitter module 222 which includes optics for deflecting a portion of the beam to the diagnostic module 218, or otherwise allowing a small portion of the outcoupled beam to reach the diagnostic module 218, while a main beam portion 220 is allowed to continue as the output beam 220 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 218. A holographic beam sampler, transmission grating, partially transmissive reflection diffraction grating, grism, prism or other refractive, dispersive and/or transmissive optic or optics may also be used to separate a small beam portion from the main beam 220 for detection at the diagnostic module 218, while allowing most of the main beam 220 to reach an application process directly or via an imaging system or otherwise. These optics or additional optics may be used to filter out visible radiation such as the red emission from atomic fluorine in the gas mixture from the split off beam prior to detection.

The output beam 220 may be transmitted at the beam splitter module while a reflected beam portion is directed at the diagnostic module 218, or the main beam 220 may be reflected, while a small portion is transmitted to the diagnostic module 218. The portion of the outcoupled beam that continues past the beam splitter module 222 is the output beam 220 of the laser, which propagates toward an industrial or experimental application such as an imaging system and workpiece for photolithographic applications.

The diagnostic module 218 preferably includes at least one energy detector. This detector measures the total energy of the beam portion that corresponds directly to the energy of the output beam 220 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 222 to control the intensity, spectral distribution and/or other parameters of the radiation impinging upon the detector (see U.S. patent application Ser. No. 09/172,805, 09/741,465, 09/712,877, 09/771,013 and 09/771,366, each of which is assigned to the same assignee as the present application and is hereby incorporated by reference).

One other component of the diagnostic module 218 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 216 and optics control modules 210, 212, gas handling module 206, power supply and pulser modules 203, 204, or other laser system component modules. For example, the total pressure of the gas mixture in the laser tube 202 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosure

Particularly for the molecular fluorine laser system, and also for the ArF and KrF laser systems, an enclosure (not shown) preferably seals the beam path of the beam 220 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 202 and the optics modules 210 and 212 and between the beam splitter 222 and the diagnostic module 218 (see the Ser. Nos. 09/317,695, 09/594,892 and 09/598,552 applications, incorporated by reference above). The optics modules 210 and 212 are maintained in an atmosphere that is sufficiently evacuated or have an inert gas purged atmosphere. Preferred enclosures are described in detail in U.S. patent application Ser. No. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

Gas Mixture

The laser gas mixture is initially filled into the laser chamber 202 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 202 of, e.g., 100 liters, total pressure adjustments and gas replacement procedures may be performed using the gas handling module 206 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 202 may also be performed. Total pressure adjustments may be followed by gas composition adjustments if it is determined that, e.g., other than the desired partial pressure of halogen gas is within the laser tube 202 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 206 connected to the laser tube 202 either directly or through an additional valve assembly, such as may include a small compartment for regulating the amount of gas injected (see the '459 application), may include a gas line for injecting a premix A including 1%$F_2$: 99%Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 202 via the valve assembly, the fluorine concentration in the laser tube 202 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 216 which controls valve assemblies of the gas handling unit 206 and the laser tube 202 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm, 0.5 pm, 0.4 pm or less). These exemplary embodiments may be used along with a wavefront compensating optic (see, e.g., U.S. patent application Ser. No. 09/960,875, which is assigned to the same assignee as the present application and is hereby incorporated by reference). For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 09/883,128, which is assigned to the same assignee and is hereby incorporated by reference). Line-narrowing of the broadband emission of the ArF and/or KrF lasers may be as set forth below.

Exemplary line-narrowing optics contained in the optics module 210 include a beam expander, an optional interferometric device such as an etalon or a device having a pair of opposed non-planar reflection plates such as may be described in the Ser. No. 09/715,803 or No. 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 210, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 210. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 210 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 212 preferably includes means for outcoupling the beam 220, such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment, gas pressure adjustments in the modules 210, 212, or reconfiguration procedures (see the '353, '695, '277, '554 applications, and the '470 patent, each mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 202 following a new fill procedure. In addition, gas injection actions such as µHIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 202. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, $BaF_2$, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and /or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. No. 09/599,130 and No. 60/228,184, which are assigned to the same assignee and are hereby incorporated by reference. The amplifier may be the same or a separate discharge chamber 202. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. An excimer or molecular fluorine laser, comprising:
    a laser chamber filled with a gas mixture and including a heat exchanger and fan for circulating the gas mixture within the chamber;
    a pulser module powered by a high voltage power supply;
    a plurality of electrodes within the laser chamber connected to the pulser module for energizing the gas mixture;
    a gas handling module coupled to the laser chamber for filling and injecting one or more components of the gas mixture into the laser chamber; and
    a resonator including said discharge chamber and one or more line-narrowing optics for generating an output laser beam,
    wherein the resonator includes a pair of resonator reflector elements and a transmissive interferometer including a pair of opposing reflecting surfaces configured so that the interferometer is tuned to have a transmissivity maximum at a selected wavelength around approximately an intensity maximum of the beam incident upon the interferometer, and at least one sideband of the transmissivity spectrum of the interferometer is also within the intensity spectrum of the beam incident upon the interferometer, the interferometer being aligned at an angle within the resonator so that the beam reflected from the interferometer is reflected outside of an acceptance angle of the resonator, the interferometer being disposed between said pair of resonator reflector surfaces; and wherein said first and second opposing reflecting surfaces have an optical distance, n·d, therebetween which is varied over at least a portion of said incident beam cross-section thereby suppressing said at least one sideband around said transmissivity maximum due to said reflection outside said acceptance angle of said resonator to provide an output beam at high spectral purity.

2. The laser of claim 1, wherein said first of said pair of opposing reflecting surfaces is non-planar, and wherein said non-planar first reflecting surface includes a curved portion.

3. The laser of claim 2, wherein said interferometer also serves to output couple the laser beam.

4. The laser of claim 1, wherein said interferometer also serves to output couple the laser beam.

5. The laser of claim 4, wherein said first of said pair of opposing reflecting surfaces is curved.

6. The laser of claim 5, wherein the first of said pair of opposing reflecting surface has a curvature over its entire surface area.

7. The laser of claim 5, wherein said curvature is constant across at least one cross-dimension of the first of said opposing reflecting surfaces.

8. The laser of claim 5, wherein said first of said opposing reflecting surfaces is substantially cylindrically shaped.

9. The laser of claim 5, wherein said first of said opposing reflecting surfaces is substantially spherically shaped.

10. The laser of claim 4, wherein said first of said pair of opposing reflecting surfaces has a constant curvature over at least an incident beam width.

11. The laser of claim 10, wherein said curvature is cylindrical.

12. The laser of claim 10, wherein said curvature is spherical.

13. The laser of claim 4, wherein said first of said pair of opposing reflecting surfaces forms part of a coupling component coupled to a base optical block opposing the second surface of said pair of opposing reflecting surfaces.

14. The laser of claim 13, wherein said coupling component is adhesively coupled with said base optical block surface.

15. The laser of claim 13, wherein said base optical block has a slot defined therein, and said coupling component includes a mating extension that fits said slot for coupling said coupling component with said base optical block.

16. The laser of claim 13, wherein said second surface is a surface of an opposing base optical block of said interferometer.

17. The laser of claim 16, wherein said opposing base optical blocks are coupled together by a spacer assembly.

18. The laser of claim 1, wherein said first of said pair of opposing reflecting surfaces is curved.

19. The laser of claim 18, wherein the first of said pair of opposing reflecting surface has a curvature over its entire surface area.

20. The laser of claim 18, wherein said curvature is constant across at least one cross-dimension of the first of said opposing reflecting surfaces.

21. The laser of claim 18, wherein said first of said opposing reflecting surfaces is substantially cylindrically shaped.

22. The laser of claim 18, wherein said first of said opposing reflecting surfaces is substantially spherically shaped.

23. The laser of claim 1, wherein said first of said pair of opposing reflecting surfaces has a constant curvature over at least an incident beam width.

24. The laser of claim 23, wherein said curvature is cylindrical.

25. The laser of claim 23, wherein said curvature is spherical.

26. The laser of claim 1, wherein said first of said pair of opposing reflecting surfaces forms part of a coupling component coupled to a base optical block opposing the second surface of said pair of opposing reflecting surfaces.

27. The laser of claim 26, wherein said coupling component is adhesively coupled with said base optical block surface.

28. The laser of claim 26, wherein said base optical block has a slot defined therein, and said coupling component includes a mating extension that fits said slot for coupling said coupling component with said base optical block.

29. The laser of claim 26, wherein said second surface is a surface of an opposing base optical block of said interferometer.

30. The laser of claim 29, wherein said opposing base optical blocks are coupled together by a spacer assembly.

* * * * *